United States Patent [19]
Faggian

[11] 3,939,452
[45] Feb. 17, 1976

[54] DESK-TOP ELECTRONIC COMPUTER WITH MOS CIRCUIT LOGIC

[75] Inventor: Gian Franco Faggian, Ivrea (Turin), Italy

[73] Assignee: Ing. C. Olivetti & C., S.p.A., Ivrea (Turin), Italy

[22] Filed: July 11, 1973

[21] Appl. No.: 378,354

[52] U.S. Cl. .......................................... 340/172.5
[51] Int. Cl.² G06F 15/20; G06F 13/00; G06F 9/06; G06F 9/16
[58] Field of Search .................. 340/172.5; 235/156

[56] References Cited
UNITED STATES PATENTS

| | | | |
|---|---|---|---|
| 3,462,742 | 8/1969 | Miller | 340/172.5 |
| 3,475,732 | 10/1969 | Ausan | 340/172.5 |
| 3,579,201 | 5/1971 | Langley | 340/172.5 |
| 3,593,313 | 7/1971 | Tomaszewski | 340/172.5 |
| 3,646,522 | 2/1972 | Furman | 340/172.5 |
| 3,676,656 | 7/1972 | Schmidt | 235/156 |
| 3,702,988 | 11/1972 | Haney | 340/172.5 |
| 3,716,843 | 2/1973 | Schmitt | 340/172.5 |
| 3,757,306 | 9/1973 | Boone | 340/172.5 |
| 3,757,308 | 9/1973 | Fosnick | 340/172.5 |
| 3,760,370 | 9/1973 | Cochran | 340/172.5 |
| 3,800,129 | 3/1974 | Umstatto | 340/172.5 |

OTHER PUBLICATIONS

Publication, "Intel MCS-4 Micro-Computer Set" Jan. 1972, Intel Corporation, No. 72/02/2.

*Primary Examiner*—Gareth D. Shaw
*Assistant Examiner*—James D. Thomas
*Attorney, Agent, or Firm*—I. J. Schaefer

[57] ABSTRACT

A desk-top electronic computer with MOS circuit logic comprising an input device, an output device and a logic unit adapted to carry out the various operations of the computer. The logic unit is disposed on at least two MOS circuit chips synchronized by a main oscillator. Each MOS chip is provided with a corresponding timing circuit adapted to generate mutually coordinated timing signals. The logic unit includes a read only memory or ROM for storing the microinstructions commanding the various functions, a computing unit and a control unit adapted to permit the selection of the microinstructions from the ROM by addressed access for the purpose of supplying a sequence of microinstructions to the computing unit, access of the address and output of the microinstructions taking place through a single connection between the ROM and the control unit.

10 Claims, 15 Drawing Figures

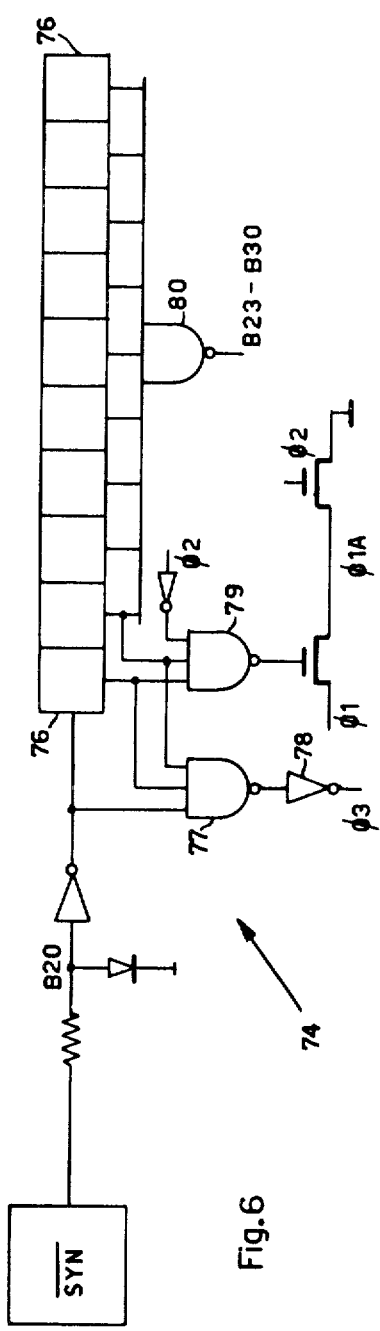
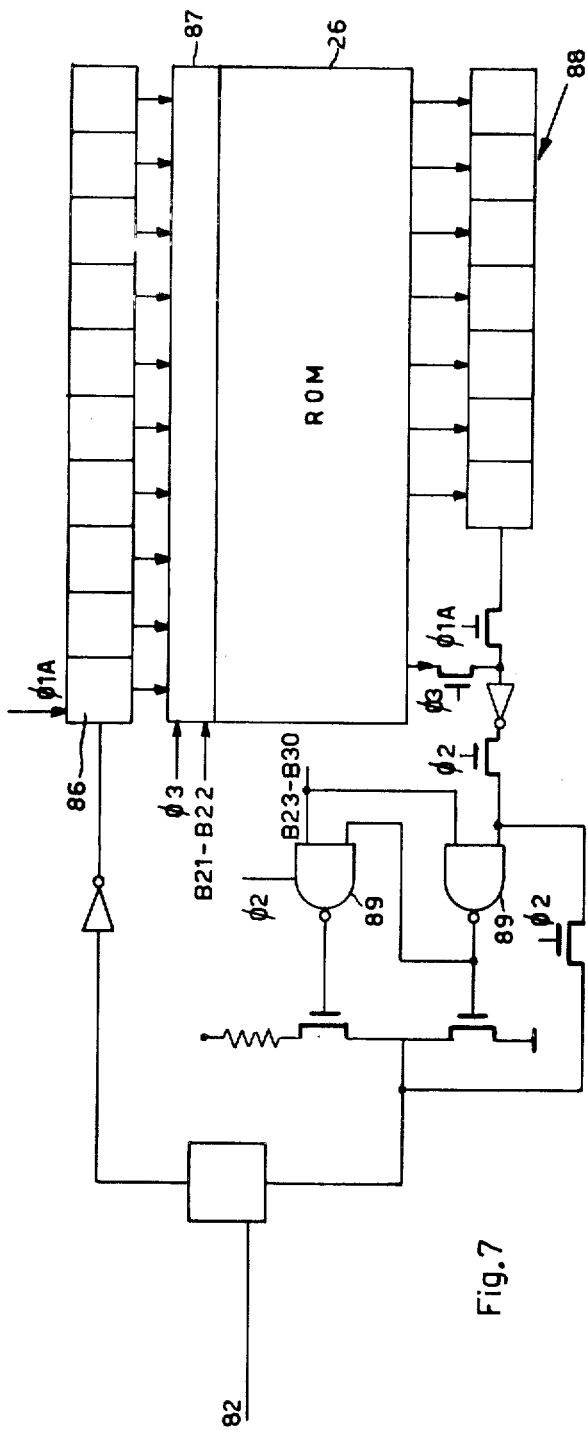
Fig.6
Fig.7

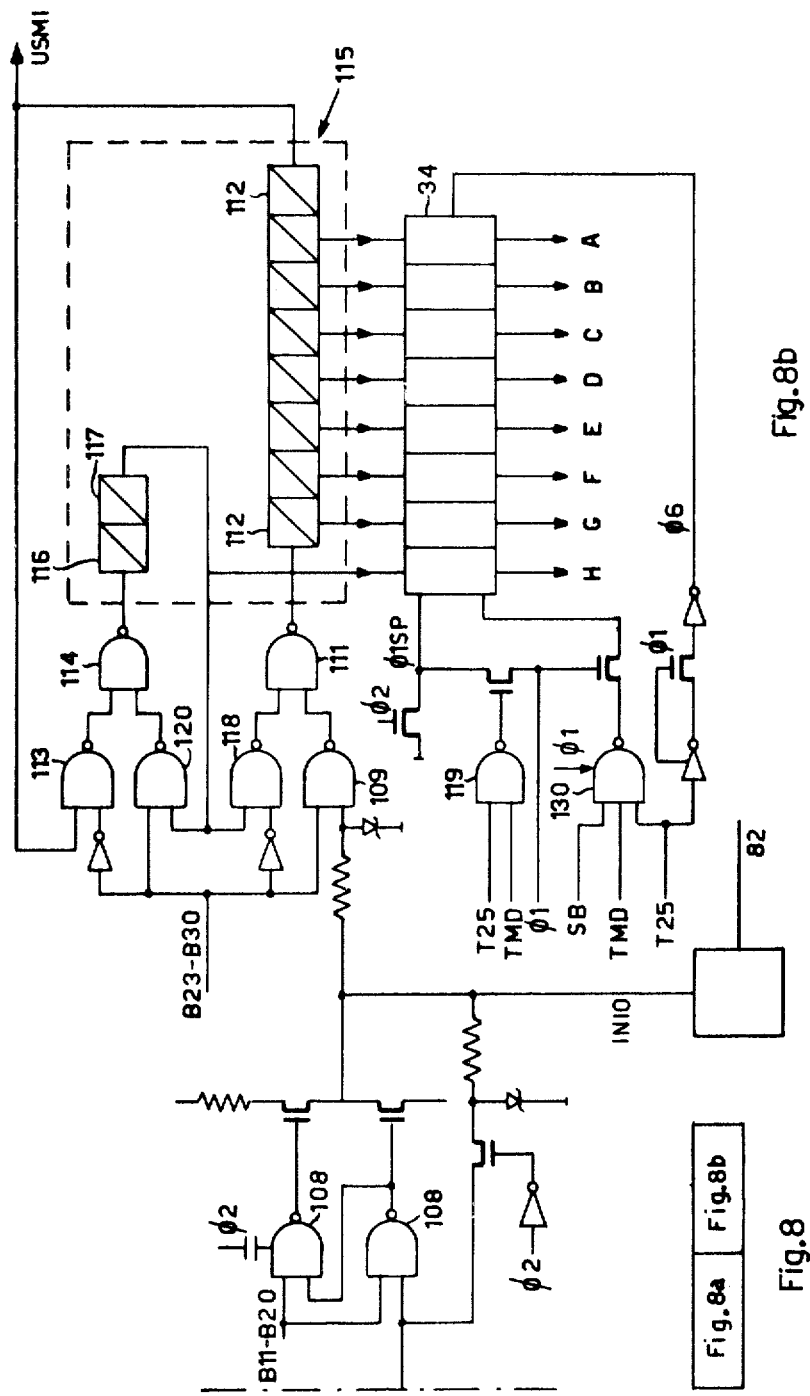

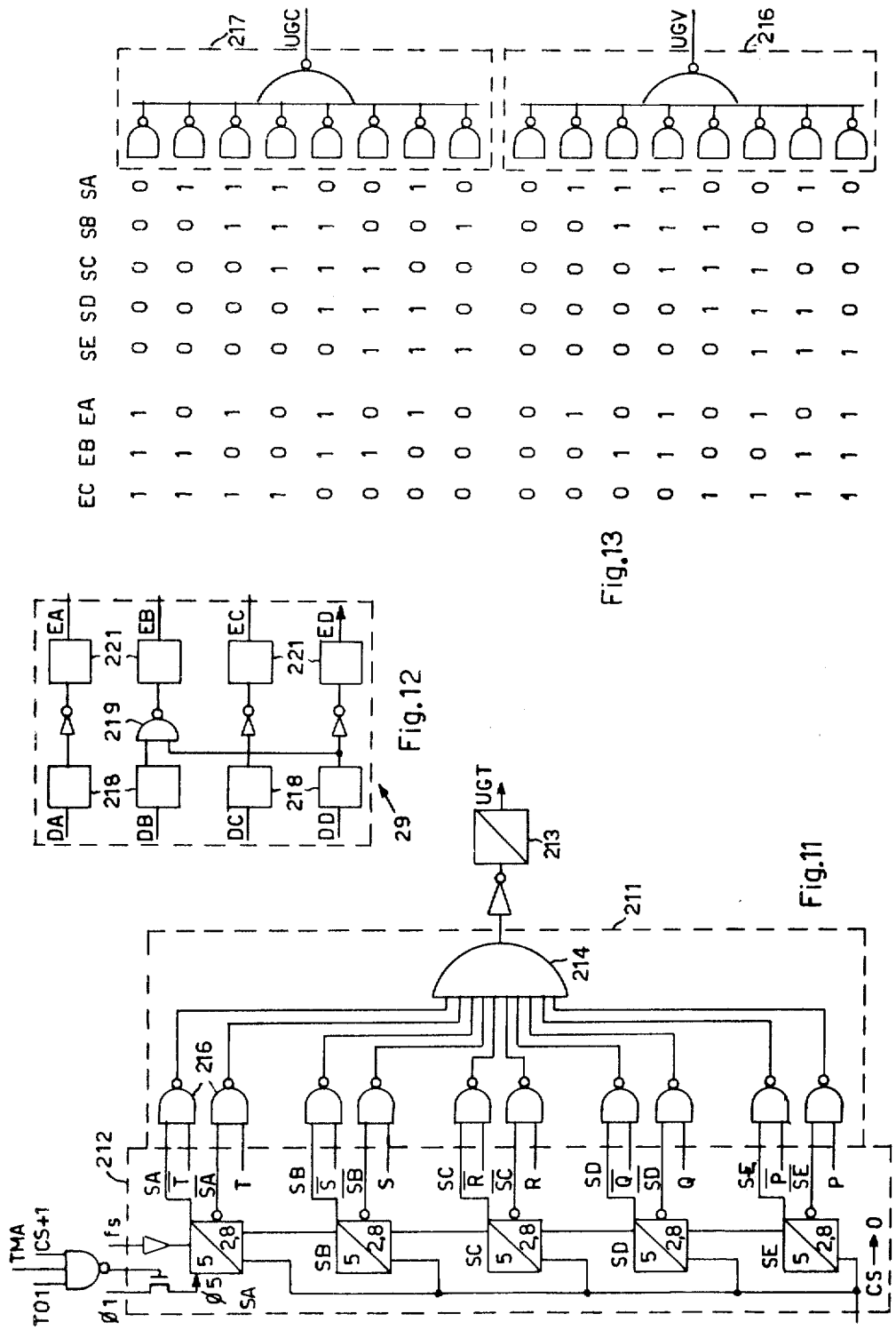

DESK-TOP ELECTRONIC COMPUTER WITH MOS CIRCUIT LOGIC

BACKGROUND OF THE INVENTION

The present invention relates to a desk-top electronic computer with MOS circuit logic, comprising an input device, an output device, and a logic unit adapted to carry out the various operations of the machine, the logic unit being disposed on at least two MOS circuit chips.

Known electronic computers are generally provided with logic circuits comprising discrete components and integrated circuit components. They include static stores, for example core stores, or dynamic stores, for example delay line stores, which make construction of the machine relatively costly and operation thereof delicate.

Electronic computers have also already been proposed in which the logic circuits are obtained by large scale integration in accordance with MOS circuit logic, thus achieving high miniaturization with the minimum use of labor. The MOS circuits are generally distributed on one or more chips controlled by a timing circuit which becomes relatively complicated.

Moreover, known computers comprise a read-only memory (ROM) in which the microinstructions are recorded and which is connected to the computing unit by means of a plurality of channels for input into the store and output from the store. Therefore, even electronic computers employing MOS circuits are still relatively complicated.

SUMMARY OF THE INVENTION

One object of the invention consists in producing an electronic computer having a very simple and efficient timing system for the MOS circuit chips.

According to the present invention, there is provided a desk-top electronic computer with MOS circuit logic, comprising an input device, an output device, and a logic unit adapted to carry out the various operations of the machine, the logic unit being disposed on at least two MOS circuit chips, each of which is provided with its own timing circuit adapted to generate mutually coordinated timing signals, the timing circuits being interconnected with each other.

A subsidiary object of the invention consists in producing an electronic computer having a ROM for storing the microinstructions which is connected to a computing unit and a control unit in a manner which is simple and such as to profit to the maximum from the advantages of the dynamic logic of the MOS circuits.

This is achieved in a computer according to the invention which further includes a ROM for storing the microinstructions commanding the various functions, a computing unit and a control unit adapted to permit the selection of the microinstructions from the ROM by addressed access for the purpose of supplying a sequence of microinstructions to the computing unit, access of the address and output of the microinstructions taking place through a single connection between the ROM and the control unit.

Preferably, the logic unit comprises dynamic counters for counting cyclically from 0 to a predetermined number in consequence of a microinstruction in the ROM, and comparison means controlled by the counters for producing the input of numbers into the computing unit by means of the input device in accordance with the pre-established decimal order and at a predetermined instant of the logical operation.

The electronic computer thus permits the maximum flexibility for adaptation of the logic to a range of different services by merely replacing the ROM and allows easy integration of the machine in more complex systems by means of the addition of further chips, the timing of which is interlaced with that of the chips of the basic logic unit.

BRIEF DESCRIPTION OF THE DRAWINGS

The following is a description of a preferred embodiment of the invention given by way of example, with the aid of the accompanying drawings, in which:

FIG. 6 is a detailed diagram of another timing circuit of the computer;

FIG. 7 is a diagram of the input and output circuit of the ROM;

FIGS. 8, 8a and 8b are a detailed diagram of the control unit of the computer;

FIG. 11 is a diagram of a comparator for the registers of the computer;

FIG. 12 is a detailed diagram of a decimal point store of the computer;

FIG. 13 is a diagram of another two comparators for the decimal register of the computer.

DESCRIPTION OF A PREFERRED EMBODIMENT

Introduction

Figure 1:
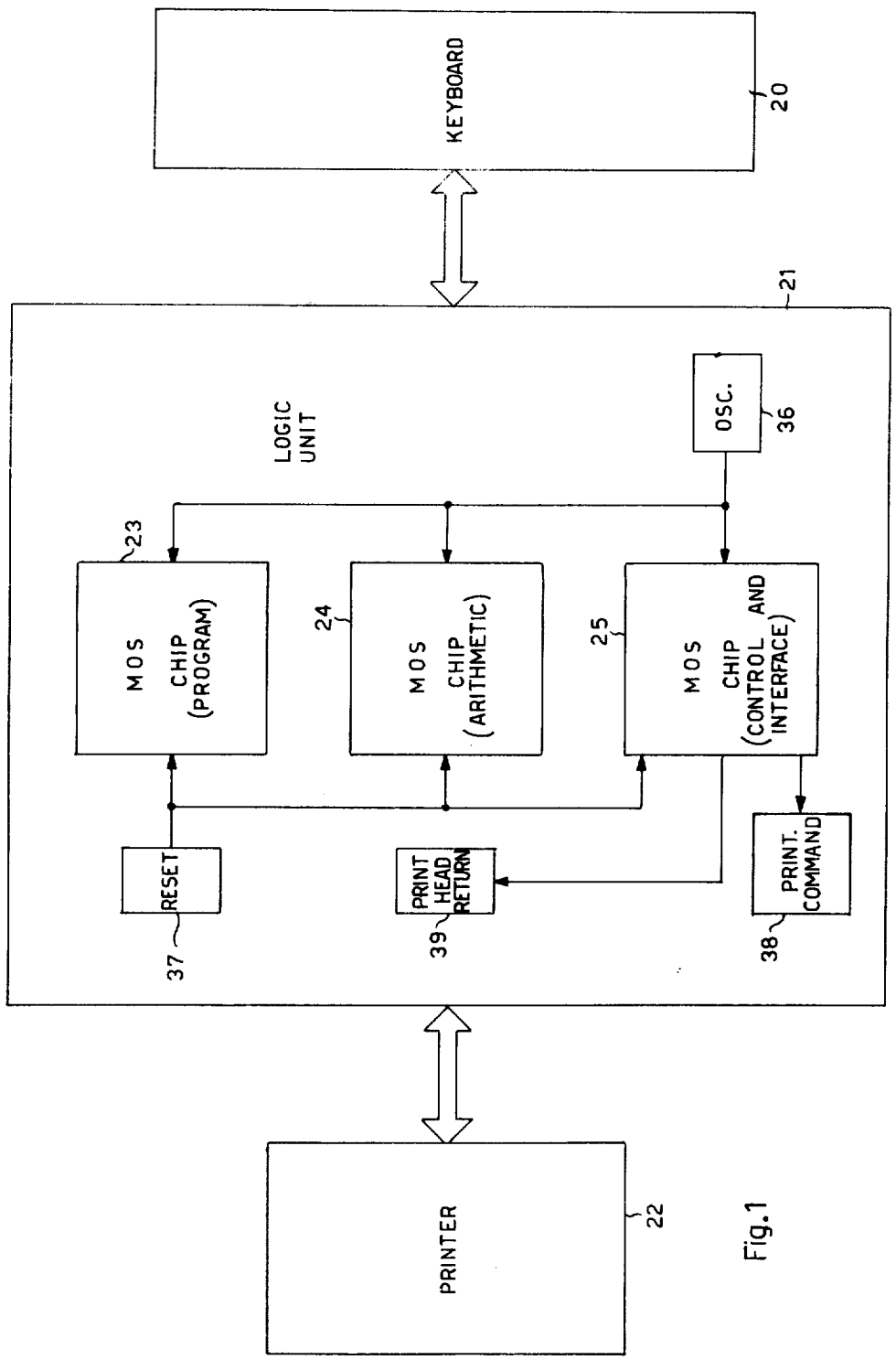
FIG. 1 is a block diagram of an electronic computer embodying the invention.

The electronic computer embodying the invention essentially comprises an input device constituted by a keyboard 20 (FIG. 1) which enables the data to be introduced and the instructions relating to the data a logic unit 21 which enabled the data provided by the keyboard to be stored and the instructions provided by the keyboard to be executed, and an output device constituted by a printer 22 which receives the commands from the electronic assembly and prints the results.

The logic unit 21 is composed of a single printed circuit board on which are mounted three MOS circuit chips 23, 24 and 25. The chip 23 (FIG. 2) constitutes the program unit and essentially comprises a ROM 26 in which the microinstructions of the machine are recorded. The chip 24 constitutes the arithmetic unit and contains essentially four registers A, M, R and T1 and the computing unit S. It moreover comprises the two end cells of a register T2, the other cells of which are disposed on the chip 23. The chip 25 constitutes the control and interface unit with the input and output and essentially contains an input circuit 27 having a buffer 28 into which the data introduced from the keyboard 20 (FIG. 1) are loaded, a decimal point store 29 (FIG. 2) for storing the number of decimals, an output circuit 31 and a control unit 32 which comprises an address register 33 for supplying the addresses to the ROM 26, and a microinstruction register 34 which stores the microinstructions. The microinstructions, suitably decoded by a decoder 35, command the operations of the circuits of the chip 25. The logic unit 21 (FIG. 1) moreover comprises an oscillator 36, an automatic reset circuit 37, a printing command circuit 38 and a circuit 39 commanding the return of the printing head. The addresses are formed in the register 33 of the control unit 32 either automatically through progressive selection, that is by adding a +1 to the code of the preceding one, or they are taken from the keyboard 20 (FIG. 1) or are taken from the ROM 26 itself (FIG. 2) by means of so-called jumps.

The microinstructions are also stored in a register 34' similar to the register 34, and included in the chip 24. The register 34' is associated with a corresponding decoder 35' which commands the various operations of the circuits of the chip 24. The address is formed by ten bits in binary code, which is expressed in decimal code, while the microinstruction is composed of eight bits translated into hexadecimal code.

The electronic computer can operate algebraically both with a floating point and with a fixed point. With a floating point, it operates and prints all the decimals entered, while the result is printed with the number of decimals preselected. With a fixed point, it operates and prints only the number of decimals which is preselected from the keyboard 20 (FIG. 1) and variable from zero to seven. To this end there is provided on the keyboard 20 a small wheel having ten positions, the first eight of which serve in two conditions which will be called "red two" and "red three", respectively, and for commanding the discarding of two and three digits, respectively. With a floating point, the number of decimals preselected can be varied continuously, while with a fixed point they can be varied only by operating the usual reset key, since with the first entry following the reset the number of decimals which is preselected is stored in the register 29 (FIG. 2).

Each of the five registers A, M, R, T1 and T2 has a capacity of 25 characters, seven of which are for the decimal digits, seventeen for the whole digits and the 25th for the sign of the number contained in the register. The maximum number of whole digits storable is 16, since the seventeenth serves as a signal that capacity has been exceeded. A capacity-exceeded signal is also obtained when the decimal digits and the whole digits together form a number greater than 16. One of the two signals can be inhibited permanently so as to enable the same chip to be used for two different models of computer with two different register capacities.

All the digits introduced from the keyboard 20 are stored in the register A, from which they are taken for printing thereof when necessary. With fixed point, the register T2 is used solely for storing the constant and is not accessible from outside, while with floating point the constant can be modified from outside by a relative addition on or substraction in a manner known per se.

Every possible addition or substraction which utilizes the register T1 or T2 takes place between the data contained in the register A and the contents of the register concerned, in which the result will be then located in manner known per se. The operations of accumulation of products and quotients are executed with the register T1. The registers M and R are used in various complex operations and the register R is used as an auxiliary result register.

At the end of each operation the register R contains the following: in multiplication, the complete result; in division, the remainder; in accumulation of products, the complete result of the multiplication; in computation of square, the corresponding result; in accumulation of quotients, the remainder of the division; in calculation of percentage, if with floating point, the capital, if with fixed point, the interest. In extraction of a root, on the other hand, the register R is zeroized.

The keyboard 20 moreover includes a second wheel which permits rounding off to 0, +5 and "all 9's" of the least significant digit of the decimals of the result of the multiplication, accumulation of products, percentage and square. Moreover, by setting the decimals wheel in the red two or three decimal digits, respectively, the rounding off of the first two or three useful digits in accordance with the setting of the second wheel is obtained.

Timing

Figure 2:
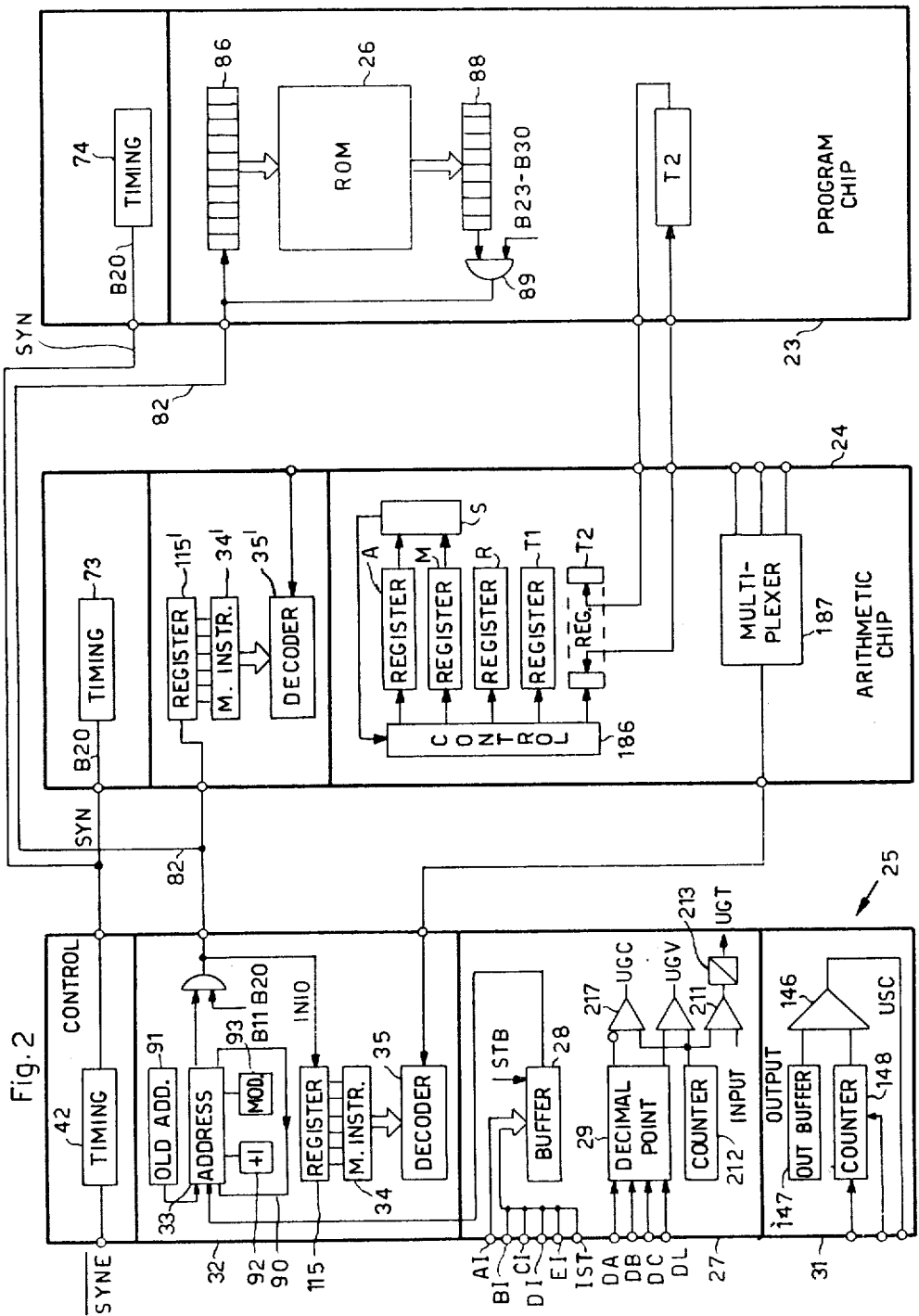
FIG. 2 is a diagram of the MOS circuit chips of the logic unit of the computer.

The MOS circuits of the machine are controlled by a suitable timing system comprising a timing circuit for each chip, the three circuits being driven by the oscillator 36 (FIG. 1).

Figure 3:
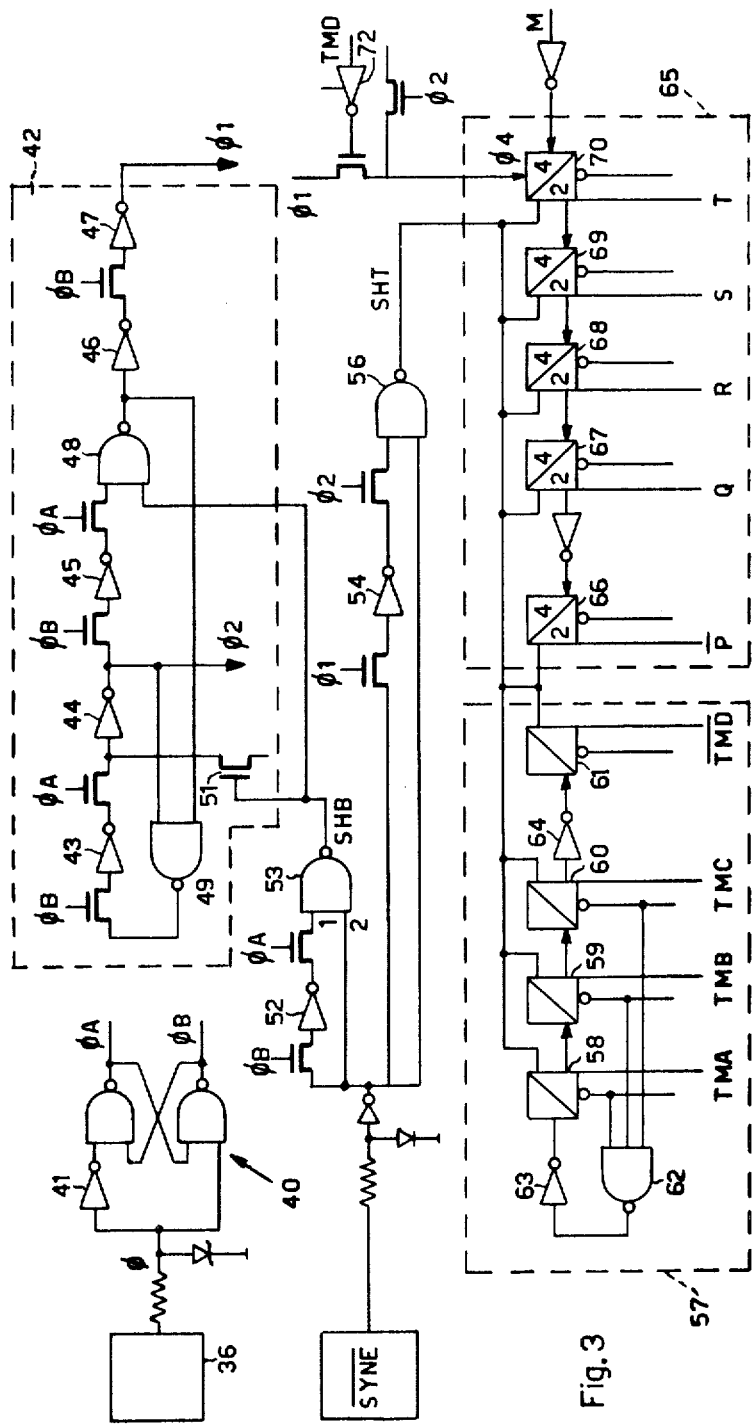
FIG. 3 is a detailed diagram of a timing circuit of the computer.

More particularly, thhe oscillator 36 (FIG. 3) supplies a signal $\phi$ (see also FIG. 4) having a period of 1.6 us. The signal $\phi$, in turn, through the medium of a MOS flip-flop cell 40 including an inverter 41, generates two signals $\phi A$ and $\phi B$ in phase opposition with each other and having the same period.

Since the inverter 41 has a certain delay due to the switching time, when the signal $\phi$ changes to one the signal $\phi A$ follows it after two delay increments and the signal $\phi B$ changes to zero after three delay increments. When the signal $\phi$ changes to zero, the signal $\phi B$ changes to one after one delay increment and the signal $\phi A$ changes to zero after two delay increments. Since the signal $\phi B$ is inside the signal $\phi A$ in this way the result is obtained that the signals $\phi A$ and $\phi B$ will never be simultaneously at zero.

The signals $\phi A$ and $\phi B$, in turn, control a first timing circuit 42 (FIG. 2) contained in the chip 25. In fact, through the medium of a MOS circuit comprising a series of five inverters 43 to 47 (FIG. 3) and two NAND circuits 48 and 49, the signals $\phi A$ and $\phi B$ generate two signals $\phi 1$ and $\phi 2$. The circuit 42 is moreover controlled by a signal SHB (FIG. 3) which, as will be seen better hereinafter, goes to zero during the first signal $\phi B$ and then remains always at one. The signal SHB at zero causes a MOS element 51 to conduct, transferring the one to the input of the inverter 44. Since the signals $\phi A$ and $\phi B$ change alternately to zero and with SHB at zero we have $\phi B$ at zero, the following Table which analyzes all the truths of the inverters 43 to 47 and of the NAND circuit 48 and 49 after each signal $\phi B$ and $\phi A$ can be completed.

|     | $\phi B$ | $\phi A$ | $\phi B$ | $\phi A$ | $\phi B$ | $\phi A$ | $\phi B$ |   |          |
| --- | --- | --- | --- | --- | --- | --- | --- | --- | --- |
| SHB | 0 | 1 | 1 | 1 | 1 | 1 | 1 |   |          |
| 43  | 0 | 0 | 0 | 0 | 1 | 1 | 0 |   |          |
| 44  | 0 | 1 | 1 | 1 | 1 | 0 | 0 | → | $\phi 2$ |
| 45  | 1 | 1 | 0 | 0 | 0 | 0 | 1 |   |          |
| 46  | 0 | 1 | 1 | 0 | 0 | 0 | 0 |   |          |
| 47  | 1 | 1 | 0 | 0 | 1 | 1 | 1 | → | $\phi 1$ |
| 48  | 1 | 0 | 0 | 1 | 1 | 1 | 1 |   |          |

-continued

| | φB | φA | φB | φA | φB | φA | φB |
|---|---|---|---|---|---|---|---|
| 49 | 1 | 1 | 1 | 0 | 0 | 1 | 1 |

Figure 4:
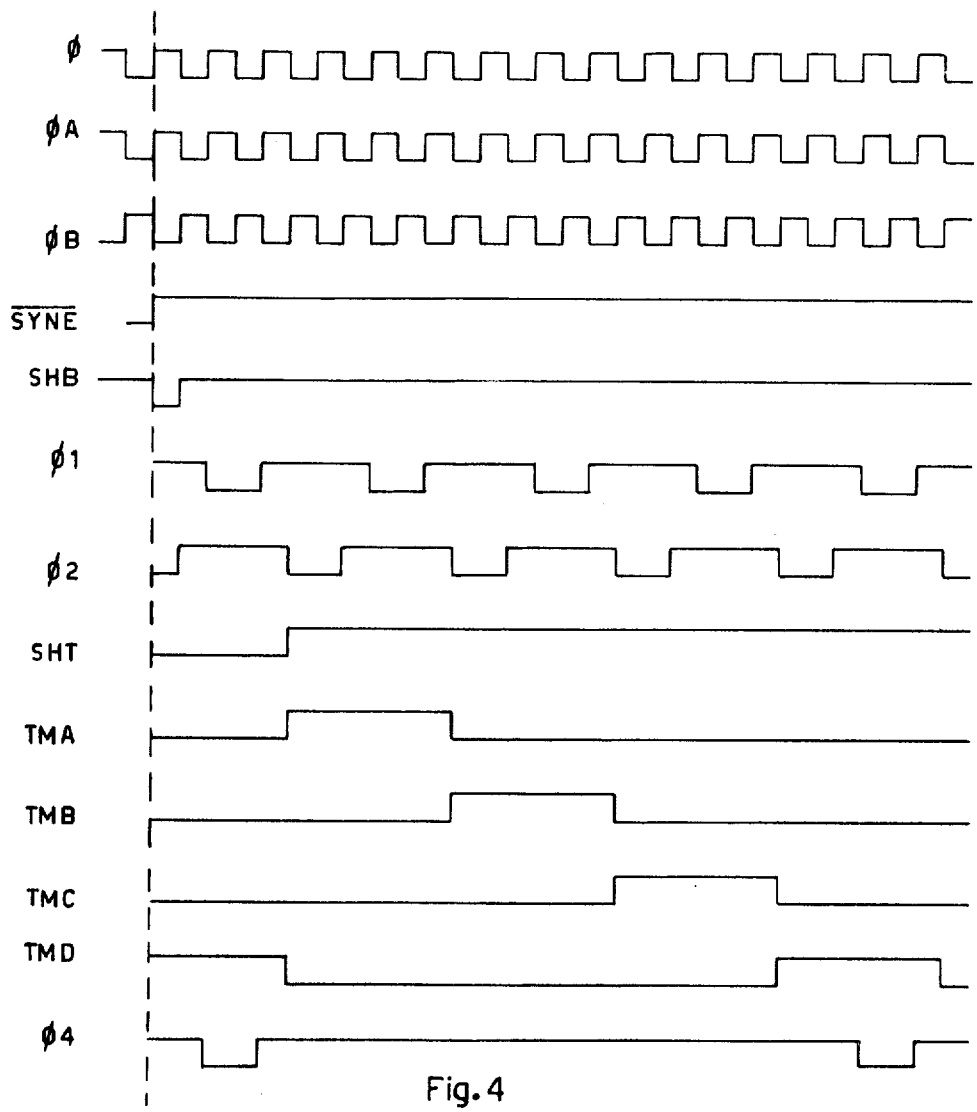
FIG. 4 is a diagram of the basic timing of the computer.

It can be observed from the Table that after three signals φB and three signals φA the state of the seven outputs is exactly the same as the initial state and therefore from this point the cycle will be repeated continuously with the period of φA = φB being 1.6 μs and the period of the machine signals φ1 and φ2 is 1.6 μs × 3 = 4.8 μs, as indicated in FIG. 4.

The signal SHB can be generated by a synchronizing signal $\overline{SYNE}$ (FIGS. 3 and 4) which can be used to drive one or more machines by means of a test apparatus. The signal $\overline{SYNE}$ in reality is, therefore, not a machine signal, but an external signal which is introduced to the circuit to synchronize the start of the cycle. In the absence of the signal $\overline{SYNE}$, the machine, however, runs with an arbitrary start to the cycle, without nevertheless, impairing the operation thereof.

For simplicity of explanation, let us consider the case of the presence of the signal $\overline{SYNE}$. This signal initially at zero through an inverter 52, driven by the signal φB, maintains at one an input 1 of the NAND circuit 53 driven in turn by the signal φA and therefore maintains at one the signal SHB which determines the exact beginning of the timing of the machine. Since the signal $\overline{SYNE}$ is applied with the leading edge of the signal φ, as soon as it changes to one the signal SHB changes to zero through the other input 2 and will remain at zero throughout the signal φB. In fact, the input 1 of the NAND circuit 53 will go to zero only with the beginning of φA and, therefore, with the end of φB, sending SHB back to one and keeping it in this situation, as indicated in FIG. 4.

A similar circuit comprising an inverter 54 and a NAND circuit 56, but driven by the signals φ1 and φ2, generates a signal SHT which remains at zero until the decline of φ2 and serves to position the shifts of the timing of the registers A, M, R, T1 and T2 (FIG. 2) of the machine.

Since each of these registers is composed of 25 characters and each character is formed by four weighted bits to give a total of 100 bits, it is necessary to be able to count and identify them as they shift to identify the weights and a counter is required for the characters.

The shifting of the weight obtained bits is counted by a counter 57 (FIG. 3) having four dynamic MOS cells 58, 59, 60 and 61, clocked by signals φ1 and φ2 and with automatic regeneration through a NAND circuit 62 and an inverter 63, the outputs TMA, TMB, TMC, $\overline{TMD}$ of the four cells 58 to 61 of this counter corresponding respectively to the weights 1, 2, 4, 8.

The signal SHT, going to zero, sets the cells 58, 59 and 60 at zero, while the cell 61, being connected to the cell 60 through an inverter 64, sends to one the inverted output TMD. Since $\overline{TMA}$, $\overline{TMB}$, $\overline{TMC}$ are at one, there is a one at the input of the cell 58 and, with the first signal φ1, TMA will go to one and TMD to zero. The four cells 58, 59, 60 and 61 being dynamic, there will always be one cell at one and the remaining cells will be at zero, as indicated in FIGS. 4 and 5.

Figure 5:
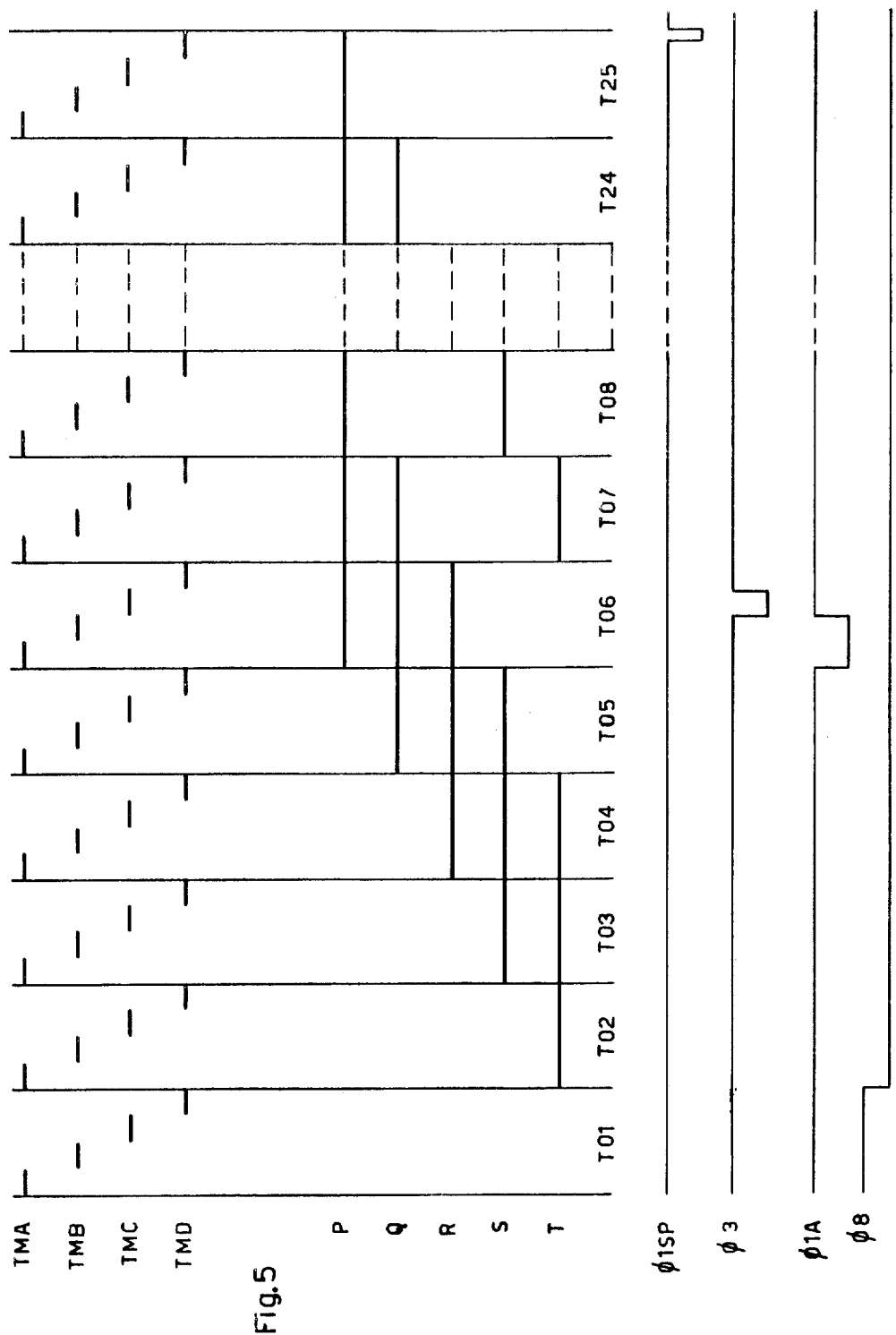
FIG. 5 is a diagram of the timing of the registers of the computer.

To count the 25 characters, there is used a counter 65 having five dynamic MOS cells 66, 67, 68, 69 and 70 (FIG. 3), the outputs P, Q, R, S and T of which give corresponding signals (FIG. 5). This counter 65 comprises a particular input function given by the equation:
$$M = P\overline{R} + \overline{P}R + P\overline{QRST} + PQRST.$$

At the beginning, the signal SHT at zero sends the cells 67, 68, 69 and 70 (FIG. 3) to zero, while the cell 66, connected to the cell 67 by means of an inverter, sends to one the inverted output P. This situation is regarded as that relating to the 25th and last character. Remembering that the shifting of the weighted bits is defined by the signal TMD, it may be said that with the signal SHT the machine is in the state T25-TMD, that is on the one hundredth and last bit.

At each signal TMD, driving the signal φ1 through an inverter 72, a signal φ4 (FIG. 4) is generated and causes all the cells 67 to 70 (FIG. 3) to shift to the left by one place. The contents of the cell 66 are therefore lost and there is introduced into the cell 70 a new digit which depends on the value of the function M. Considering only the first two addends of the function M, it can be seen that these are the exclusive-OR of the signals P and R. That is, if P and R are equal in the preceding configuration, a one will be introduced into the cell 70 with the signal φ4; if they are different, a zero will be introduced, so that in the first case, with P = 1 and R = 1, we have
$$\overline{M} = P\overline{R} + \overline{P}R = \overline{1.0} + \overline{0.1} = \overline{0+0} = 1$$
and in the second case, with P = 0 and R = 1, we have
$$\overline{M} = P\overline{R} + \overline{P}R = \overline{0.0} + \overline{1.1} = \overline{0+1} = 0$$

Starting from the initial situation (10000), the above-mentioned rule enables the following Table of the 25 characters defined by the position of the signals P, Q, R, S, T of the five cells 66 to 70 to be compiled.

| Character | P | Q | R | S | T | Character | P | Q | R | S | T |
|---|---|---|---|---|---|---|---|---|---|---|---|
| T25 | 1 | 0 | 0 | 0 | 0 | T13 | 0 | 0 | 1 | 0 | 1 |
| T01 | 0 | 0 | 0 | 0 | 0 | T14 | 0 | 1 | 0 | 1 | 0 |
| T02 | 0 | 0 | 0 | 0 | 1 | T15 | 1 | 0 | 1 | 0 | 1 |
| T03 | 0 | 0 | 0 | 1 | 1 | T16 | 0 | 1 | 0 | 1 | 1 |
| T04 | 0 | 0 | 1 | 1 | 1 | T17 | 1 | 0 | 1 | 1 | 1 |
| T05 | 0 | 1 | 1 | 1 | 0 | T18 | 0 | 1 | 1 | 1 | 1 |
| T06 | 1 | 1 | 1 | 0 | 0 | T19 | 1 | 1 | 1 | 1 | 0 |
| T07 | 1 | 1 | 0 | 0 | 1 | T20 | 1 | 1 | 1 | 0 | 1 |
| T08 | 1 | 0 | 0 | 1 | 0 | T21 | 1 | 1 | 0 | 1 | 1 |
| T09 | 0 | 0 | 1 | 0 | 0 | T22 | 1 | 0 | 1 | 1 | 0 |
| T10 | 0 | 1 | 0 | 0 | 0 | T23 | 0 | 1 | 1 | 0 | 0 |
| T11 | 1 | 0 | 0 | 0 | 1 | T24 | 1 | 1 | 0 | 0 | 0 |
| T12 | 0 | 0 | 0 | 1 | 0 | T25 | 1 | 0 | 0 | 0 | 0 |

The third addend of the function $\overline{M}$ is $P\overline{QRST}$ and this is used when this configuration (10110) is reached, that is for the character T22. In fact, in the time T23, instead of introducing a one into the cell 70, a zero is introduced by jumping seven configurations. This jump is made in order to use only 25 of the 32 positions obtainable with this type of counter 65.

The fourth addend of the function $\overline{M}$ is PQRST, which corresponds to all ones in the cells 66 to 70 and is used in switching on in the absence of the signal $\overline{SYNE}$. In fact, it may happen that all the cells 66 to 70 are set at one and in this case the counter would remain blocked in this position. The addend PQRST then introduces a zero into the cell 70, in spite of the bits P and R being equal, sending the counter back to the character T19 (11110), from which the timing will begin. In this way there are generated in any case the 100 bits, which will be indicated by the references B1, B2 . . . B100 and which identify a machine cycle. By these bits there can be identified all those particular times in which the machines performs given operations.

By way of example, there will be analyzed here the case of the bits B10–B17, which represents the time between the instant at which the bit 10 is at one and that at which the bit 17 is at one. All the other times are analyzed in a similar manner. Since each character is formed by four bits, the bits B10, B11 and B12 are comprised in the third character and since the bit B9 is not concerned an AND is produced between the code of the third character and the signal $\overline{TMA}$, that is excluding TMA, which is the first bit time of the character. The fourth character (00111) is wholly concerned by the signals B13–B16. Of the fifth character, only the first bit time is used, that is TMA, which will be in AND relationship with the code of the fifth character (01110). The resulting equation will therefore be:

B10–B17 = 00011·$\overline{TMA}$ + 00111 + 01110·TMA

In the chip 24 (FIG. 2) there is provided a timing circuit 73 similar to the circuit 42 which has just been described, so that it is not described in detail here. The same timings are repeated in the circuit 73 with the same logic as that of the circuit 42. The differences with respect to the circuit 42 are related only to the output P, which is now direct, and to the function M, which is without addend PQRST.

The reset of the circuit 73 is given by a signal SYN, which is sent by the circuit 42 on receiving the bit B20. The signal B20 sends to zero the nine cells defining the 100 bits, the cell of the signal TMD which is inverted and therefore goes to one being excluded.

We therefore have the following configuration:

| P | Q | R | S | T | TMA | TMB | TMC | TMD |
|---|---|---|---|---|-----|-----|-----|-----|
| 0 | 0 | 0 | 0 | 0 | 0   | 0   | 0   | 1   | which is considered as B20 in the circuit 72.

All the bit times will therefore be delayed by 20 places, that is by five characters, with respect to the circuit 42 of the chip 25. This creates a difference in the decoding of those particular times which are used by the machine, but the operation remains unchanged.

In the chip 23 there is provided another timing circuit 74 which is also commanded by the signal B20 of the circuit 42 in correspondence with the bit B20. The circuit 74 (FIG. 6) comprises a series of ten cells 76 the first of which is connected to a NAND circuit 77 which generates a signal $\phi 3$ (FIG. 5) through an inverter 78. Moreover, a second NAND circuit 79 (FIG. 6) connected to the first two cells 76 and driven by a signal $\phi 2$ drives at its output a MOS cell $\phi 1$ to generate a signal $\phi 1A$ which copies the signal $\phi 1$ excluding the period from B21–B22 (FIG. 5 indicates the period in which the signals $\phi 1A$ occur). The cells 76, with the exclusion of the first, are connected to a NAND circuit 80 (FIG. 6), the output of which therefore supplies the signals B23–B30.

It is therefore clear that each chip 23, 24, 25 is provided with its own timing circuit 74, 73, 42, respectively, adapted to generate mutually coordinated timing signals in each chip and that the timing circuits 74, 73 and 42 are interconnected. This arrangement reduces the number of connections between the various chips to the minimum.

Interface unit

The chip 25 (FIG. 2) is called the interface chip since it receives as input the command signals from outside, carries out an operative conversation with the other two chips 23 and 24 and sends the printing commands to the printer 22 (FIG. 1).

The keyboard 20 sends the information already coded over six channels to six set-reset flip-flops which give the signals AI, BI, CI, DI, EI and IST (FIG. 2). The signal IST serves to recognize whether a function key (IST=1) or a numeric key (IST=0) is concerned.

By operating any key there is also generated a signal which serves to reset the six flip-flops, while a second signal STB loads the code, obtained from the positioning of the six flip-flops, into the buffer 28, which is constituted by 10 series parallel dynamic MOS cells. The address which is formed in the buffer 28 is formed by 10 bits, four of which, that is the first three (001) and the last (0), are fixed, while the others are positioned by the six flip-flops. During the 100 bits after the loading of the code, the address recirculates along the cells of the buffer 28.

The output circuit 31 indicates to the printer 22 (FIG. 1) which symbol is to be printed. This task is performed by a comparator 146 (FIG. 2) adapted to generate a signal USC following upon the comparison of a buffer 147, in which the code of the symbol to be printed is loaded, with a counter 148 for synchronizing signals of the type-bearing element, in a manner known per se. The signal USC then commands a striking command circuit.

Program unit

The operation of the machine is based on the continuous dialogue between the control unit 32 (FIG. 2) and the ROM 26. An address is sent to the address register or of input to the memory 33 in the time B1–B10 and from here, through a conductor 82, to the ROM 26. The ROM 26 always replies through the same conductor 82 with the corresponding microinstruction, which is stored in the register 34 and decoded by the decoder 35 to command a given function of the machine.

Figure 8A:
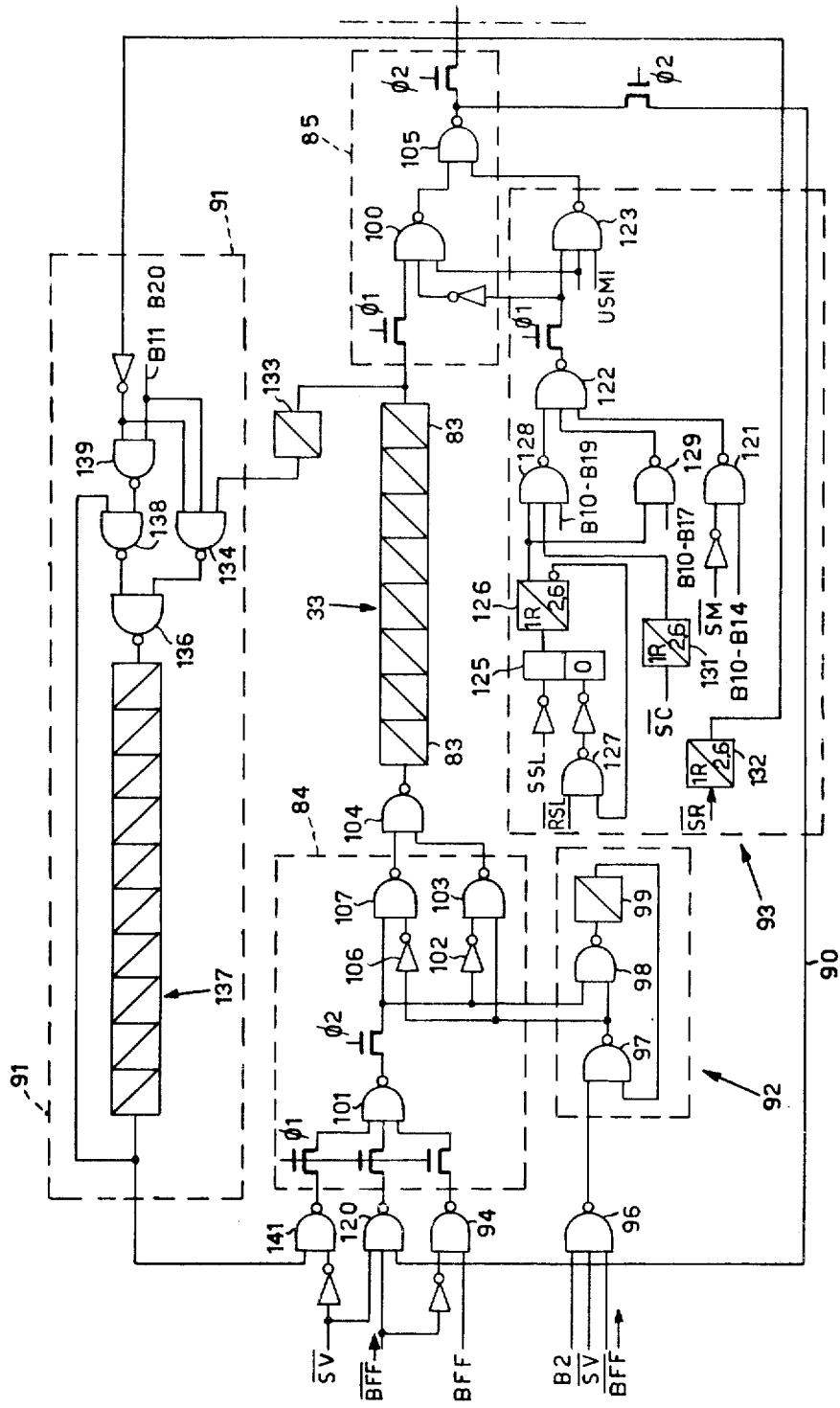

The ROM 26 comprises 960 addresses to which there correspond 960 microinstructions each comprising eight bits. While each address is constituted by ten bits, the register 33 (FIG. 8a) is composed of eight dynamic cells 83. The remaining two cells constitute in one case an input circuit 84 of the register 33 and in the other case an output circuit 85 of the register 33. The 10 dynamic cells 83, 84 and 85 of the register 33 are timed by the signal $\phi 1$ and $\phi 2$, the indication of which is omitted in the cells 83 and in all the other cells driven by the same signals.

More particularly, the address of the microinstruction from which the operation is to begin is entered on the keyboard and is then introduced into the buffer 28 (FIG. 2). From this buffer 28 the address BFF is sent to the register 33 in the time B1–B10 under the command of a microinstruction BFF → , which is automatically prearranged for operation on the switching-on of the machine in a manner known per se.

During the time B11–B20, the address, coming from the register 33 through the conductor 82, enters the 10 cells of a parallelizing shift register 86 (FIG. 7). The address is shifted by the signal $\phi 1A$ which, copying $\phi 1$, excluding the period B21–B22 (FIG. 5), avoids the address being lost during the selection of the microinstruction.

In the time B21–B22, the address enters the ROM 26 through a decoder 87 (FIG. 7) controlled by the signal $\phi 3$ and selects the corresponding microinstruction in manner known per se. At the beginning of the time B23, the microinstruction composed of eight bits enters eight cells of a serializing register 88. The loading is enabled by the signal $\phi 3$ which goes to 0 in the time B23 (FIG. 5). The register 88 is connected to the conductor 82 through a pair of NAND circuits 89 adapted to connect the conductor 82 to the register 87 in the time B23-B30 and to render this connection inoperative in the absence of the signals B23-B30. In the time B23-B30, therefore, the microinstruction issues from the register 88 through the conductor 82 and, under the control of the signal $\phi 2$, enters a pair of shift registers 115 and 115' (FIG. 2) which act as a buffer for the microinstructions which are to enter the register 34'. Thus the ROM 26 disposed on the chip 23 is accessible by means of input addresses to supply microinstructions. The addresses (in the period B11-B20) and the microinstructions being able to circulate serially alternately through the single conductor 82 with the logic unit 25 (contained in the other chips 24 and 25).

The previous address is not lost, but circulates normally through the register 33 throughout the cycle along a line 90. At each cycle, the address is increased by one through the medium of a circuit 92 and re-enters the register 33, so that in the absence of particular microinstructions the reading of the ROM 26 is effected sequentially.

In the reading of the ROM 26 (FIG. 2) jumps may be made, so is it possible to pass to an address which is not the following one, by means of an address-modifying circuit 93. Return to the address departed from constitutes a particular type of jump which is commanded by a microinstruction SV. There is then performed first a jump and the respective function associated therewith, which prearranges a further jump to the previous address stored in an old-address circuit 91. The addition of the +1 in the register 33 is effected at the beginning of each cycle, except in the presence of the microinstruction BFF → and the microinstruction SV for the return jump to the old address.

The address can therefore enter the register 33 through the three different paths, one for the input of the contents BFF of the buffer 28, another for the input of the contents which issue from the register 33 increased by one by the circuit 92, and another for the input of the contents of the register 91 which effects return to the old address stored therein.

Sequential reading of the ROM

More particularly, the contents of the register 33 normally circulate through two NAND circuits 100 and 105 (FIG. 8a), the line 90 and a NAND circuit 120. For introduction of a new address, the microinstruction BFF activates an input circuit of the register 33, constituted by a NAND circuit 94 which enables the address in the buffer 28 (FIG. 2) to enter the cell 84 (FIG. 8a) of the register 33. Owing to incrementing of the address by one, in the time B2 the output of a NAND circuit 96 goes to zero and the output of a second NAND circuit 97 of the circuit 92, connected to another NAND circuit 98 and a dynamic cell 99 of the circuit 92, goes to one. At this instant there arrives from a NAND circuit 101 of the cell 84 the bit of weight one of the address to which + 1 is to be added. If the bit of weight one of the address is at zero, the output of the NAND circuit 120 is at one, the output of the NAND is zero and, through the medium of an inverter 102, sends the output of a NAND circuit 103 to zero, as a result of which, through another NAND circuit 104, there will be a one at the input of the first cell 83 of the register 33. At the same instant, the input of the cell 99 is at one, so that at the end of B2, that is in the time B3, the output of the NAND circuit 96 and of the cell 99 goes to one and the output of the NAND circuit 97 goes to zero. This last-mentioned circuit remains at zero until the following cycle, so that through the medium of an inverter 106 and another NAND circuit 107 it permits the passage of the remaining part of the address without producing further changes.

If, on the other hand, during the time B2, the bit of weight one of the address is at one, the outputs of the NAND circuits 103 and 107 go to one and, through the NAND circuit 104, there is a zero at the input of the first cell 83, while the input of the cell 99 is at zero. In the time B3, the cell 99, has a carry function, maintains the output of the NAND circuit 97 at one, as in the preceding case and changing thus the bit of weight two. At the following cycles the preceding operations will be repeated until the output of the NAND 101 will be zero, sending then to zero the output of the NAND 97. In such manner, the circuit 92 counts the less significant portion of the ROM address and in every memory cycle such portion of a unity for selecting a following address of the memory in the ROM. The input register 33 of the ROM is accessible selectively by means of an input circuit comprising the NAND 94 by the keyboard. The register 33, through the circuit comprising the NAND 103, 104 and 107, is connected to the counting circuit 92 and through the circuit comprising the NAND 100 and 105, is connected to the address varying circuit 93.

In the time B10, the address is in the ten cells of the register 33 ready to enter the ROM 26 (FIG. 2) through the line 82. As already mentioned, in the time B11-B20 (FIG. 8b), through the medium of the two NAND circuits 100 and 105 of the cell 85, a pair of NAND circuits 108 connected in a similar manner to the NAND circuit 89 of FIG. 7, and the line 82, the input of the address into the read-only store 26 (FIG. 7) is enabled and takes place through the parallelizing register 86. In the time B21-B22, the ROM 26 selects the microinstruction formed by eight bits which corresponds to the address. This microinstruction is thus extracted into a serializing register 88 and is sent, through the NAND circuit 89 and the conductor 82, to a shift register 115 which is formed by eight cells 112 and a group of another two cells 116 and 117.

More particularly, in the time B23-B30, the microinstruction enters the eight cells 112 of the register 115 through a NAND circuit 109 and a NAND circuit 111 (FIG. 8b). Afterwards, the microinstruction issuing from the last cell 112 of the register 115 passes through an enabled gate 113, since the time B23-B30 has elapsed, and through a gate 114 enters the other two cells 116 and 117 of the register 115. From the last cell 117, passing through a gate 118, it re-enters the cells 112. This cycle is repeated until the time B22 of the following cycle, when a new microinstruction will arrive from the conductor 82. During the time B99, in the seventh cell 112 of the register 115 there is contained the first bit of the address, that is the one which has entered the register 115 in the time B23. The six preceding cells 112 and the cell 117 contain the other seven bits of the address.

When the time B100 is entered, the information has not yet been shifted and it will be shifted by the signal $\phi 1$ of B100. Simultaneously with the signal $\phi 1$ which effects the shift, a NAND circuit 119 generates a signal $\phi$1SP, since we have the signal T25–TMD, as a result of which the contents of the first seven cells 112 and of the cell 117 are transferred to a corresponding series of eight cells A, B, C, D, E, F, G, H of the microinstruction register 34. A signal $\phi$6 generated in known manner by the signal $\phi$1 to the exclusion of the time T25 is applied to the register 34 and serves to carry back as an input to each cell of this register the contents of the output throughout the cycle, excluding the time T25 during which a new microinstruction is loaded, as a result of which the microinstruction remains staticized and can be decoded by the decoder 35 (FIG. 2) to command the operations of the machine.

During the time B22 (FIG. 8b), the cells 116 and 117 contain the first two bits of the preceding microinstruction, which recirculate through a NAND circuit 120 during the time B23–B30. In the time B31, they will begin to recirculate together with the other eight bits of the new microinstruction, while the remaining six bits of the preceding microinstruction are lost, the NAND circuit 113 being kept at one in the time B23–B30, as a result of which part of the new instruction is now in the register 34.

Jump procedures

As has already been mentioned, jumps are made in order to pass from one address to another address which is not the following one. The following four types of jump are provided: the single-character jump SM commanded by the code (101), the conditional jump SC commanded by the code (100), the unconditional jump SI commanded by the code (110) and the address-reserving SR commanded by the code (111). The jumps SC, SI, SR are two-character jumps, that is they comprise two microinstructions.

The object of the jump SM is to cause the operative flow to be continued at brief intervals. It is therefore sufficient to modify the address entering the ROM 26 (FIG. 7) by five bits, while the other three bits present the code of the jump SM. There will therefore now be obtained a jump within the range of $2^5 = 32$ cells of the read-only memory 26.

When, at the end of a certain cycle, the codes stored in the cells H, G, F of the register 34 (FIG. 8b) are respectively 1, 0, 1, the signal SM is generated and energizes a NAND circuit 121 (FIG. 8a) of the address modifying circuit 93. In the cycle following in time B10–B14, the output of the NAND circuit 121 is zero. The output of a NAND circuit 122 being at one, input of the first five codes of the register 33 is permitted through a NAND circuit 123. These five codes are sent in the time B11–B15 through the two NAND circuits 123 and 105, the two NAND circuits 108 (FIG. 8b) and the line 82 to the ROM 26 (FIG. 7).

In the time B15–B19 the output of the NAND circuit 121 (FIG. 8a) returns to zero, as a result of which the cells of the register 115 are blocked through the medium of the NAND circuit 122. In the time B16–B20, the last five codes of the preceding address contained in the register 33 enter the ROM 26 (FIG. 7), so that the jump takes place in one of the adjacent cells of the group of 32 cells of the ROM 26.

The conditional jump SC is formed by a first microinstruction, in which there are contained the recognition code (100) and the jump condition, and a second microinstruction containing the address to which a jump is to be made. This jump is used when, having arrived at a certain point of the operative flow, two paths can be taken according to whether the code of the condition of the jump is formed by all zeros or is different from zero.

If the code of the condition is zero, the operative flow continues without making the jump; if, on the other hand, it is different from zero, the jump is made. The conditional jump has $2^8 = 256$ jump possibilities. When, at the end of a certain cycle, the codes stored in the cells H, G, F of the register 34 (FIG. 8b) are respectively 1, 0, 0, two signals SB, SC are generated in known manner. Since the jump signals are an AND between the code contained in the register 34 and the jump condition, if the condition is different from zero there is generated a third signal SSL = 1 which is an OR of all the two character jumps (SC+SI+SR), while if the condition is at zero this signal is not generated.

Through a flip-flop 125, the signal SSL = 1 sends the input of a cell 126 to one, taking into account that the other two inputs of a NAND circuit 127 are normally at one. Through a NAND circuit 128, the output of the cell 126 then enables the NAND circuit 122. In the meantime, the contents of the register 33 have been automatically incremented by +1 by the circuit 92. The new address is sent in the time B11–B20 through the NAND circuits 100, 105, 108 (FIG. 8b) and the line 82 to the ROM 26 (FIG. 7), which responds in the time B23–B30 with the second microinstruction of the jump, that is the address as has been hereinbefore described. With the signal $\phi$1 of the time B100 arises a signal $\phi$IR equal to $\phi$ISP which shifts on the output the signal one of the cell 126. Since TMD, T25, SB are at one, a zero enters the register 34 (FIG. 8b) through a NAND circuit 130. With the signal $\phi$2 of TOI there is introduced an all zeros code into the register 34, whereby at the end of T25, the signals SB, SC and SSL are sent to zero.

In the third cycle in the time B10–B17, the signal given by the cell 126 (FIG. 8a) puts the output of the NAND circuit 122 at zero through a NAND circuit 129. Since the output of the NAND circuit 121 is at zero, input of the eight bits USMI contained in the register 115 is permitted through the NAND circuit 123 and they are sent in the time B11–B18 to the ROM 26 as jump address. Since the output of the NAND circuit 129 returns to zero in the time B18–B19, the transfer of the content of the register 115 is blocked and in the time B19–B20 the last two codes of the preceding address contained in the register 33 enter the ROM 26. The flow will then resume from this new address. It is to be noted that a third input of the NAND 100 and 123 is constantly at one during the normal operation. This input goes into zero during the cycles where the reset circuit 37 is operating. In this last case only zeros are inserted in the cells of the input register 86 of the ROM 26.

In the unconditional jump SI, in addition to the first part of the two-character instruction containing the code (110) of the unconditional jump, it contains two address digits in the last significant places of the character corresponding to the cells A and B of the register 34 (FIG. 8b). In the second part of the two-character instruction there are contained the other eight digits of the address. In all, the new address is composed of 10 digits. There are therefore $2^{10} = 1024$ jump possibilities. Since the total capacity of the ROM 26 (FIG. 7) is 960 microinstructions by using an unconditional jump it is possible to cover the entire ROM 26.

In the first cycle of the jump SI, at the time B23-B30, the ROM 26 sends the first character of the instruction SI, which is staticized and the decoding of which causes the signals SB and SL to be generated in known manner. In the second cycle, the preceding address, increased by one, is sent to the ROM 26 and at the time B23-B30 the microinstruction containing the second character of the instruction SI enters the register 34 (FIG. 8b). In fact, at the time B23-B30, the two least significant digits of the first microinstruction circulate through the cells 116 and 117 of the register 115 and, at the time B31, will be in code at the address formed by the second part of the two-character instruction. At the time B100, the NAND circuit 130 zeroizes the register 34 and the right output of the cell 12 present the cell 128.

In the third cycle, at the time B10-B19, the output of the NAND circuit 128 (FIG. 8a) is at zero, because as the signal SC is not generated the cell 131 is at one. The output of the NAND circuit 122 is therefore at one, thus permitting the input of the 10 codes contained in the register 115, which are sent to the ROM 26 (FIG. 7) in the time B11-B20.

The address-reserving jump SR is like the unconditional jump SI, but in contrast to the latter maintains the old address and, after the jump has been made, returns to the departure point.

At the end of the first cycle, the code 111 of the jump SR sends the signals SB, SL and SR which inverted signal enters a cell 132 (FIG. 8a) equal to the cell 126. At the end of the second cycle, the signal issuing from the cell 132 goes to zero. In the third cycle, the old address, that is the address containing the second part of the two-character instruction, already increased by one, passes through a cell 133, which makes up in this case. In the time B11-B20, by way of two NAND circuits 134 and 136, the address enters a shift register 137 of supply address of the old-address circuit 91. From B21 onwards, the output of a NAND circuit 139 is kept at one by the signal issuing from the cell 132. Consequently, the contents of the register 137 can recirculate through a NAND circuit 138 under the control of the NAND circuit 139, through the agency of the signals B11-B20, and in the other cases through the agency of the signal of the cell 133. This will be repeated until such time as a code SV indicating the old-address jump appears in the staticizing register 34.

In the cycle, following in time B1-B10, the code SV, by way of a NAND circuit 141 and the NAND circuit 101, enables the input of the old address into the register 33 and, at the same time, by way of the NAND circuits 96 and 97, holds the output of the latter at zero, which thus blocks incrementing by +1 by the circuit 92.

As cited above it results thus apparent that the varying addresses circuit 93 is controlled by logical conditions SM, SC, SR for selecting on the ROM 26 an address different from that selected by the counting means 92. The linkage circuit includes the NAND 100 and 105 and enables the entry to the cell 85 of the register 33 of the data contained in the varying address circuit 93.

Computing unit

The computing unit S (FIG. 2) is adapted to effect the addition of the contents of the registers A and M. These registers, having a capacity of 25 characters are constituted by 100 dynamic shifting cells shifted by the signals $\phi1$ and $\phi2$. The sign of the registers is therefore contained in the last four cells relevant to the time T25.

Figure 9:
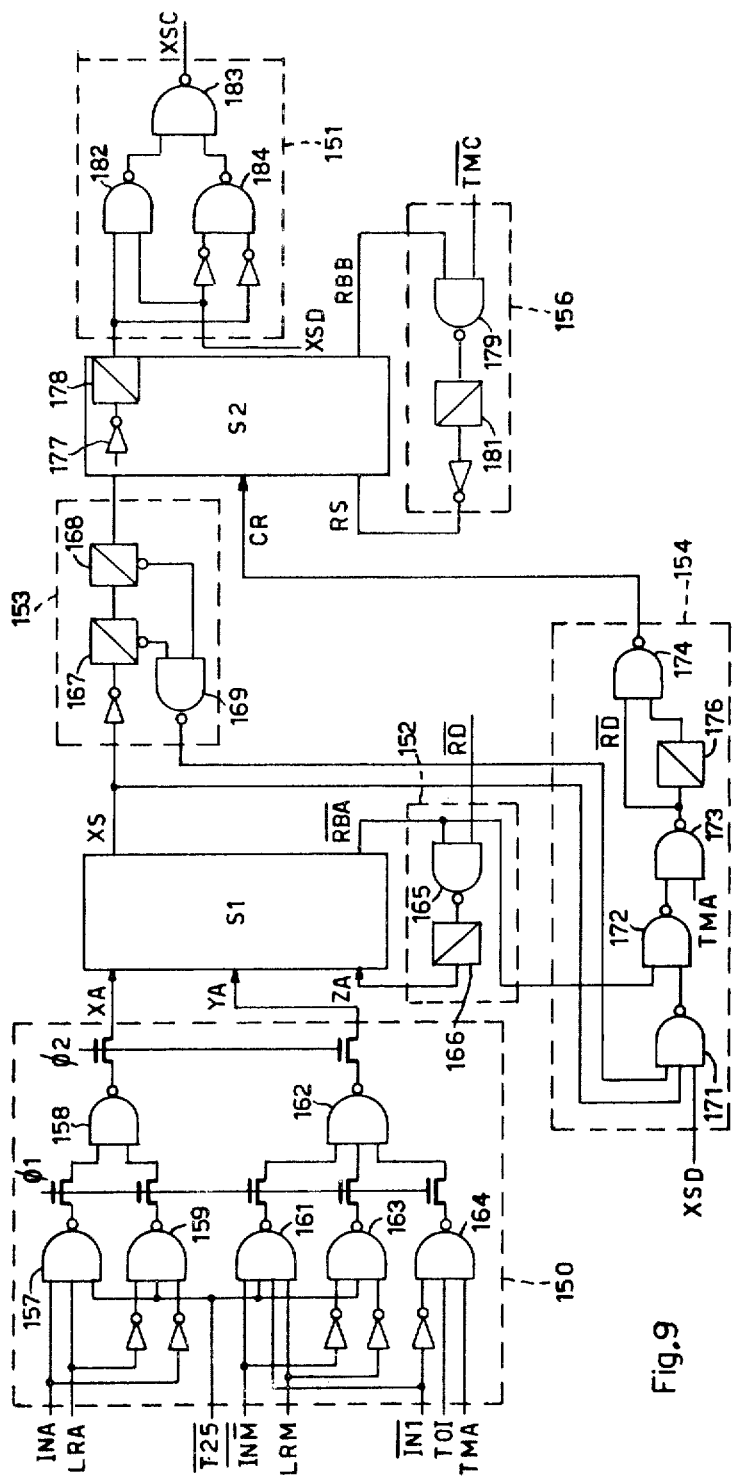
FIG. 9 is a diagram of the adder of the computer.

The computing unit S effects the addition A+M, and incrementing of the contents of the register A, that is the addition A+1. The computing unit S can also effect the subtractions A−M and A−1, modifying the inputs by the negative addend and giving the negative result at the end of the addition. This distinction is provided by a signal XSD (FIG. 9) which is at one in cases of addition and at zero in cases of subtraction.

Since the digits are coded in the binary decimal system, the computing unit S (FIG. 2) is binary, so that the following cases may occur:

result of the addition between 0 and 9, in which the result is already in place and can be written in the register A;

result of the addition between 10 and 15, in which the result does not represent any number in code and must be corrected by adding +6;

result of the addition between 16 and 19, in which a carry appears during the bit of weight 8 and in which the result may be corrected by adding +6.

The computing unit S includes a first adder S1 (FIG. 9) connected to an input circuit 150 and a second adder S2 connected to an output circuit 151. The input circuit 150 decides what the inputs XA and YA of the adder S1 must be in relation to the microinstruction which is being developed. The values arriving at the inputs XA and YA are added together and, in the event of a carry being generated, a carry circuit 152 inputs to the adder S1 the carry ZA, which is added on the following bit together with the values of XA and YA.

The result of the adder S1 passes through a circuit 153, which serves to identify the cases in which it is necessary to make the correction by +6. The same result of the adder S1 enters the adder S2, where it is added to the possible correction of the +6 generated by a circuit 154, which will be seen better hereinafter. In this case also, the possible carry is sent back by a corresponding carry circuit 156 as input on the following weight bit of the adder S2. The output of the adder S2, possibly negated in the case of subtraction, gives, through the output circuit 151, the result XSC of the operation, which, as will be seen, enters the register A.

More particularly, the microinstructions corresponding to the operations A+M and A+1 generate in known manner a signal INA which enables the passage of the contents of the register A, indicated by LRA, through two NAND circuits 157 and 158 connected in series in the input circuit 150. The signal $\overline{INA}$, on the other hand, is at one with the microinstructions A−M and A−1. In this case, the negated contents of the register A pass into the NAND circuit 158 through another NAND circuit 159.

Moreover, the microinstruction A+M and A−M generate a signal $\overline{INM}$, thus enabling the contents of the register M, indicated by LRM, to enter the adder S1 through two NAND circuits 161 and 162 connected in series in the circuit 150. With the microinstruction M−A, the signal $\overline{INM}$ goes to zero and enables the input of the negated contents of the register M into the adder S1 through a NAND 163, the NAND circuit 162 and the input YA.

With the microinstruction A+1 there is generated a signal IN1, the negation of which, through a NAND circuit 164 and the NAND circuit 162, sends a one to the input YA of the adder S1 during the first bit T01-TMA (FIG. 5), that is adds a one on the bit of weight one of the least significant character of the register A. With the microinstruction A−1, the process is similar to the preceding one, since A−1 = $\overline{A+1}$. It is to be noted that in these two cases the signal $\overline{IN1}$ at zero blocks the NAND circuit 161 (FIG. 9) and therefore prevents the contents of the register M entering the adder S1 in the period B2–B100 and falsifying the result.

While the addend to be added to the contents of the register A enters the adder S1 always through the input YA, the sign never enters the adder S1, since it is prevented by the signal $\overline{T25}$ which acts on the NAND circuits 157, 159, 161, 163, so that the adder S1 carries out the addition bit by bit commencing at T01–TMA and ending with T24–TMD. It is to be noted that in any case, because of the timing signals $\phi 1$ and $\phi 2$, the input circuit 150 delays the information by one bit time.

The output XS of the adder S1 goes to one when there is an old number of terms at one being input. When there are two or three terms at one being input, a carry is generated in the adder S1 through the agency of a signal $\overline{RBA}$ equal to zero, which produces the carry signal ZA through a NAND circuit 165 and a MOS cell 166 of the circuit 152. This signal is also generated in the case of a sum between 10 and 15. In this situation, the signal $\overline{RBA}$ is not generated at the time TMD, but, as will be seen hereinafter, the circuit 154 generated a signal RD equal to zero which replaces the signal $\overline{RBA}$ in the activation of the NAND circuit 165.

The correction by means of the addition of +6 is made only when an addition is being carried out, that is with the microinstructions A+M and A+1. This correction is produced in the circuit 154 by the signal XSD, which in these two cases is at one. If the result of the addition is between 10 and 15, the contents of the weights 2, 4, 8 of the character being examined are analyzed. Since in this case the weight 8, that is TMD (FIG. 5), is always at one, the OR between the bit of weight 4, that is TMC, and the bit of weight 2, that is TMB, must also be at one. As soon as the bit time TMA of the character following that being examined is reached, because of the circulation of the signals, at the output XS (FIG. 9) of the adder S1 there is the content of TMD, in a first cell 167 of the circuit 153 there is the negation of TMC, while in a second cell 168 of the circuit 153 there is the negation of TMB. At the output of a NAND circuit 169 there is a one if the result of the addition is between 10 and 15.

Since XSD is at one, when XS is at one and the output of the NAND circuit 169 is also at one, the output of a NAND circuit 171 of the circuit 154 goes to zero and the output of a second NAND circuit 172 of the circuit 154 goes to one. Since we are at the time TMA, the output of a NAND circuit 173 generates the signal RD equal to zero, while the output of a further NAND circuit 174 fed also by a MOS cell and by the same signal $\overline{RD}$, but delayed by one phase, generates a correction signal CR which remains at one also in the following bit time. As has been seen, at the instant under examination the code of TMB is at the output of the cell 168 and this will be added to the bit CR, while in the following time CR is added to TMC, thus producing the addition of the code 6 which corresponds to the configuration 0110.

The carry signal $\overline{RBA}$ of the adder S1 which acts on the input of the NAND circuit 172 serves to generate the signal CR when the result of the addition is between 16 and 19. In fact, in this case, the output of the NAND circuit 171 is at one, since XS is always at zero. As the addition of the contents of the cell TMD always generates a carry, the signal $\overline{RBA}$ causes the NAND circuit 174 to generate the correction signal CR.

The adder S2 is exactly similar to the adder S1 and provides for adding the correction +6 with a result between 10 and 19. The result corrected is negated by an inverter 177 and delayed by a cell 178, both of these being included in the adder S2. When the addition effected by the adder S2 generates a carry, a carry signal RBB is generated and sends the output of a NAND circuit 179 of the carry circuit 156 to zero. The signal output through a cell 181 in the following bit time sends the input RS of the adder S2 to one, so that RS is added to CR and to the signal output by the cell 168. During the addition of the bit of weight 8, on the other hand, this carry is blocked by means of the signal TMC because the corrections are only referred to the cypher examined. With the microinstructions A+1 and A+M, a signal XSD being at one, the information contained at the output of the cell 178 of the adder S2 is transferred through a NAND circuit 182 and a further NAND circuit 183 to the output circuit 151 without undergoing any changes. With the microinstructions A−M, M−A and A−1, the signal XSD is at zero and, through a NAND circuit 184, the negation of the output of the adder S2 appears at the output of the NAND circuit 183.

Transfer of the contents of the registers

The machine comprises a multiplexer circuit 187 (FIG. 2) which is an OR circuit for various situations which may arise in the machine and deriving both from the microinstructions being carried out and from other conditioning factors. Normally this circuit is used for reading the contents of the register A or M when there is a particular microinstruction. Moreover, it serves to see if the machine is operating in fixed point or floating point, if there is rounding off to 5 or to 9.

Analogously the registers A and M and also the registers R, T1 and T2 (FIG. 2) are formed by 100 dynamic cells having as clock signals the machine signals $\phi 1$ and $\phi 2$ and connected in shift register fashion. The information contained in the registers M, R, T1, T2 can be exchanged only with that in the register A through a control circuit 186, which will be referred to hereinafter.

To transfer the contents of the register A to the register M, a microinstruction M ⟷ A (FIG. 10) is extracted from the ROM 26. Normally, in the absence of the microinstruction M ⟷ A, $\overline{M \longleftrightarrow A}$ is at one. Therefore, the output signal LRM of the register M, with the next signal $\phi 1$, through two NAND circuits 188 and 189 included in the circuit 186 (see also FIG. 2), causes the information to re-enter the first cell of the register M.

When the microinstruction M ⟷ A arrives, in B23 that is considered the times beginning of the chip 24, the output of the NAND circuit 188 is always at one, while the signal LRA enables the input of the contents of the register A through a NAND circuit 190 and the NAND circuit 189. After a store cycle, the contents of the register A will be in the register M. The transfer of the contents of the register A to the registers R, T1 and T2 is identical to that to the register M and will therefore not be repeated.

When it is not desired to modify the contents of the register A the respective microinstruction gives a signal BRA at one and the information present at the output LRA of the register A can re-enter the cell corresponding to the 100th bit of the register A through a NAND circuit 193 and a NAND circuit SRA which are included in the circuit 186. Therefore, the contents of the register A circulate through the register itself and at the end of the cycle is found again unchanged in the register A.

When it is desired to insert the contents of the register M in the register A, a microinstruction M ⇄ A is at one and enables a NAND circuit 193 connected to the NAND circuit SRA, as a result of which the output LRM of the register M enters the register A. It is to be noted that in the meantime the signal BRA goes to one, the negation of which signal blocks, through the NAND circuit 192, the re-input of the contents of the register A.

What has been said with regard to the register M is also valid for the registers R, T1, T2, the outputs LRR, LRT1, LRT2 of which are introduced by means of corresponding microinstructions R ⇄ A, T1 ⇄ A, T2 ⇄ A into the register A through NAND circuits 194, 195 and 196 and the NAND circuit SRA.

With a microinstruction $\overline{A}$ → A, the contents of the register A are negated and, through a NAND circuit 197 and the NAND circuit SRA the signals $\overline{LRA}$ enter the cell corresponding to the 100th bit. The signal BRA is also at one in these cases.

As has already been seen, the sign of the contents of the register A is in the cell of character T25, that is to say in the cells of the last four bits. If the number is positive, the four bits which identify the sign are at zero. When the minus sign must be introduced, a microinstruction (−) → A is at one and in the time of the character T25 the output of a NAND circuit 198 is at zero, so that four cells of the character T25. Another NAND circuit 199 sends to the NAND circuit SRA a signal which is always at one in the situations seen so far.

An algebraic addition or substraction is commanded by a microinstruction X+Y → A. At the beginning of the cycle in which this operation is executed, the signal $\overline{X+Y}$ → A is at zero and in turn, through a NAND circuit 200, sends its output signal to one. This enables the passage of the four bits of the cells of character T25 through the NAND circuit 199 to the NAND circuit SRA and, through its negation, blocks a NAND circuit 201, excluding the character T25 from the normal cycle. In this way, the sign contained in the register A is not modified and constitutes the sign of the result.

Figure 10:
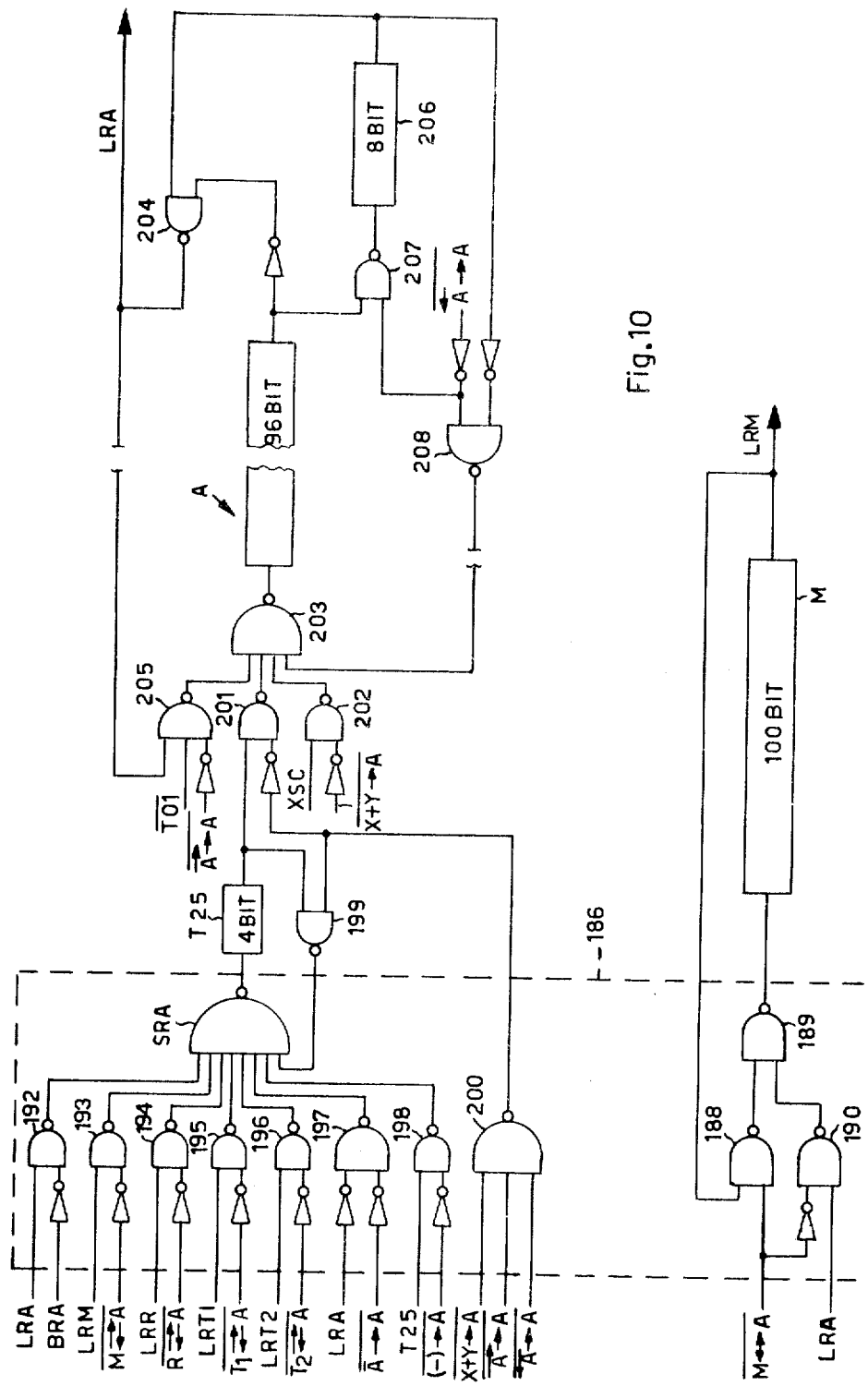
FIG. 10 is a detailed diagram of two registers and the corresponding control circuit of the computer.

The signal $\overline{X+Y}$ → A at zero enables the value XSC of the result obtained and given by the adder S2 (FIG. 9) to enter the register A through two NAND circuits 202 and 203 (FIG. 10). In the following cycle $(\overline{X+Y}$ → A) returns to one and the normal cycle is resumed.

To advance the register A, the contents are shifted by one place to the right under the control of a microinstruction $\overrightarrow{A}$ → A. This also sends to one the signal BRA which, through the NAND circuit 192, blocks the normal recirculation of the contents LRA of the register A. These contents re-enter the register A through two NAND circuits 204 and 205 and the NAND circuit 203. During the time R01, the NAND circuit 205 now causes four zeros to enter the register A in place of the code contained in T01. After 96 shifts, that is at the end of the cycle, the four zeros issue from the register A and are lost, while in location T01 there will be the code which was previously in T02. The sign is also not modified in this case, since the output of the NAND circuit 200 enables the recirculation thereof through the NAND circuit 199 and the NAND circuit SRA.

To delay the register A, the contents are shifted by one place to the left under the control of a microinstruction $\overleftarrow{A}$ → A. This sends to one the signal BRA which, through the NAND circuit 192, blocks the normal recirculation of the contents LRA of the register A. These contents re-enter a shift auxiliary register 206 which is formed by eight dynamic cells similar to those of the other registers. Previously, the cells of the register 206 were all at one, because in the preceding cycle the signal $\overleftarrow{A}$ → A and the output of a NAND circuit 207 were both at one. The contents of the register A with the eight ones of the register 206 at the head thereof re-enter the register A, through a NAND circuit 208 and the NAND circuit 203, delayed by eight bits.

Since a store cycle is constituted by 100 bit times and 96 cells are used in the register A, as the other four relating to the cell T25 contain the sign, the information which was in the cell T01 at the beginning is delayed by four bits and is now in the cell T02. In the cell T01 there are four zeros, while in the last four cells of the register 206 there is the information previously contained in the cell T24.

In the time T01 of the following cycle, the input signals LRA at the NAND circuit 192 represent the information of the cell T24 contained in the register 206, which replaces the four zeros present in the register A. In the following times T02 . . . T25, the signals LRA represent the information in the register A shifted to the left by one character, after which a return is made to the normal cycle. Also in this case, the sign of the contents of the register A remains unchanged in the cell T25.

Function comparators

The machine comprises in the chip 25 a first comparator 211 (FIG. 2) for commanding the operations in series on the registers, indicating from time to time the register cell in which operation is being carried out. To this end, the machine is provided with a function counter 212 which counts from 0 to 25. This is constituted by five static cells SA, SB, SC, SD, SE (FIG. 11) arranged in ascending fashion which have as their reset means a microinstruction indicated by the reference CS → 0. When this microinstruction issues from the ROM 26 (FIG. 7), the five cells of the counter 212 are all at zero. The contents of the cells of the counter 212 (FIG. 11) shift downward under the control of a signal $\phi 5$ which is generated at the signal $\phi 1$ of the first bit (T01-TMA) when the code of a microinstruction indicated by CS+1 is present in the microinstruction register 34 (FIG. 8b).

The contents of the cells of the service counter 212 are then maintained by a signal $\phi 8$ (FIG. 5) which remains at zero throughout the cycle excluding the character T01. At each shift, the contents of the last cell SE (FIG. 8b) on the right of the counter 212 are eliminated and a new bit is introduced into the first cell SA through a function $fs = \overline{CSE} . CSC + CSE . \overline{CSC} + \overline{CSA} . . CSB . CSB . \overline{CSD} . CSE$ such as to cause only 25 of the 32 places obtainable with this type of counter to be utilized.

Leaving from the initial situation, in the subsequent cycles, the situation of the various cells will be the following:

| Position CS | SA | SB | SC | SD | SE |
|---|---|---|---|---|---|
| CS0 | 0 | 0 | 0 | 0 | 0 |
| CS1 | 1 | 0 | 0 | 0 | 0 |
| CS2 | 1 | 1 | 0 | 0 | 0 |
| CS3 | 1 | 1 | 1 | 0 | 0 |
| CS4 | 0 | 1 | 1 | 1 | 0 |
| CS5 | 0 | 0 | 1 | 1 | 1 |
| CS6 | 1 | 0 | 0 | 1 | 1 |
| CS7 | 0 | 1 | 0 | 0 | 1 |
| CS8 | 0 | 0 | 1 | 0 | 0 |
| CS9 | 0 | 0 | 0 | 1 | 0 |
| CS10 | 1 | 0 | 0 | 0 | 1 |
| CS11 | 0 | 1 | 0 | 0 | 0 |
| CS12 | 1 | 0 | 1 | 0 | 0 |
| CS13 | 0 | 1 | 0 | 1 | 0 |
| CS14 | 1 | 0 | 1 | 0 | 1 |
| CS15 | 1 | 1 | 0 | 1 | 0 |
| CS16 | 1 | 1 | 1 | 0 | 1 |
| CS17 | 1 | 1 | 1 | 1 | 0 |
| CS18 | 0 | 1 | 1 | 1 | 1 |
| CS19 | 1 | 0 | 1 | 1 | 1 |
| CS20 | 1 | 1 | 0 | 1 | 1 |
| CS21 | 0 | 1 | 1 | 0 | 1 |
| CS22 | 0 | 0 | 1 | 1 | 0 |
| CS23 | 0 | 0 | 0 | 1 | 1 |
| CS24 | 0 | 0 | 0 | 0 | 1 |
| CS0 | 0 | 0 | 0 | 0 | 0 |

The comparator 211 (FIG. 2) compares the character counter 65 (FIG. 3) for the characters T01 to T25 with the service counter 212 (FIG. 11). The comparator 211 comprises a NAND circuit 124 (FIG. 11) having 10 inputs connected in turn to the outputs of an equal number of NAND circuits 216 to which the signals of the counters are applied. The comparator 211 is moreover connected through an inverter to a cell 213. When there is equality of the signals SA=T, SB=S, SC=R, SD=Q, SE=P, the 10 inputs of the NAND circuit 214 are all at one and the output signal UGT from the cell 213 goes to one with a delay of one bit and remains in this state for one character. The comparator 211 thus generates in the cell 213 a signal which for each cycle gives an output UGT which goes to one for a given character, while UGT remains at zero for the remaining characters. If, at each cycle, the counter 212 is incremented making CS+1, the output signal UGT of the cell 213 is shifted moving from character to character. The signal UGT can thus be used to command the operations in series on the registers, such as introduction of data, reading of data, addition and transfer of data, in a manner known per se.

The machine is moreover provided with a pair of comparator 216 and 217 (FIG. 2) for commanding the preselection of the decimals and the discarding of the decimals, which are preset by the decimals selection wheel. For each of the 10 positions, this sends to the decimals register 29 (FIG. 2) four signals DA, DB, DC, DD (FIG. 12) which vary with the position selected in accordance with the Table on the next page. These signals, which are negated in turn, are the inputs of four cells 218 which store the code.

For discarding two and three decimal digits, respectively, the wheel is brought to red two and red three. The codes 1000 and 1001, respectively, (that is the decimal digits 8 and 9), arrive from the wheel, while the logic of the machine needs the codes 2 and 3, respectively, and a signal which distinguishes these codes from the normal 2 and 3.

| POSITION OF WHEEL | DD | DC | DB | DA | ED | EC | EB | EA |
|---|---|---|---|---|---|---|---|---|
| 0 | 0 | 0 | 0 | 0 | 0 | 0 | 0 | 0 |
| 1 | 0 | 0 | 0 | 1 | 0 | 0 | 0 | 1 |
| 2 | 0 | 0 | 1 | 0 | 0 | 0 | 1 | 0 |
| 3 | 0 | 0 | 1 | 1 | 0 | 0 | 1 | 1 |
| 4 | 0 | 1 | 0 | 0 | 0 | 1 | 0 | 0 |
| 5 | 0 | 1 | 0 | 1 | 0 | 1 | 0 | 1 |
| 6 | 0 | 1 | 1 | 0 | 0 | 1 | 1 | 0 |
| 7 | 0 | 1 | 1 | 1 | 0 | 1 | 1 | 1 |
| red 2 | 1 | 0 | 0 | 0 | 1 | 0 | 1 | 0 |
| red 3 | 1 | 0 | 0 | 1 | 1 | 0 | 1 | 1 |

The signal DD=1 indicates this anomalous condition, while a NAND circuit 219 connected to the cells of the signals DD and DB inverts the signal, so that the signals to be sent to the logic are the signals EA, EB, EC and ED output by four cells 221. These cells are loaded at the signal $\phi 1D$, which goes to zero by operating the usual reset key of the machine and returns to one by operating another command key, in a manner known per se. Therefore, the number of decimals can be entered after operation of the reset key and the corresponding code is stored with the following entry.

Two signals UGV and UGC (FIG. 2) generated by the two comparators 216 and 217 serve to define the position of the decimals in the various stages of computation and printing. The comparator 216 (FIG. 13) compares the positioning of the decimal loading cells 221 of the register 29 with that of the function counter 212, while the comparator 217 compares the inverse of the cells 221 with the counter 212.

The decimal point equality signal UGV goes to that of the decimals entered, while the complementary decimal point equality signal UGC goes to one when the counter 212 reaches the value of the complement to 7 of the decimals entered. The circuit 217 which generates UGC is therefore similar to the circuit 216 generating UGV, but has input to it the configuration of the counter 212 inverted.

The signal UGC is used to identify the position of the first decimal digit after the point to be used, for example for printing. Therefore, by causing the contents of a register to shift until the signal UGC is generated the decimal digits to be discarded are eliminated.

The signal UGV is used, for example, for identifying the number of decimal digits which are to be discarded after each multiplication operation for the purpose of always keeping the same number of decimals in the register. To this end, since the number of decimals is doubled in multiplication, the contents of the register are shifted until the signal UGV is generated, thus eliminating half of the decimals of the product.

What I claim is:

1. In a desk-top electronic computer disposed on at least three semiconductor chips:
   input-output means disposed on at least the first of the three semiconductor chips for receiving data signals applied thereto and for feeding data signals therefrom to the remaining semiconductor chips;
   processing means receptive of data signals fed from said input-output means for processing the data signals, said processing means including arithmetic means disposed on the second semiconductor chip and receptive of data signals from said input-output means for performing arithmetic operations thereon, a memory instruction register and a memory address register both disposed on the first semiconductor chip, control means disposed on the third semiconductor chip and receptive of data signals from said input-output means for controlling the arithmetic means to perform selected arithmetic operations and comprising a read-only memory having addressable microinstructions stored therein and circuit means disposed on the three semiconductor chips for transferring over a first single signal conductor between the three semiconductor chips both the data signals from the memory address register to address the read-only memory and the data signals of the addressed microinstruction from the read-only memory to the memory instruction register; and timing means disposed on the three semiconductor chips and interconnected by a second single signal conductor for synchronizing the data signal flow on the three semiconductor chips.

2. A desk-top electronic computer according to claim 1, wherein said processing means comprises a plurality of registers each having a plurality of cells for storing different characters and disposed on said second chip and wherein said timing means comprises a first pair of counters disposed on said first chip and including a character counter developing signals defining character time periods for identifying the various characters in said cells of said registers and a bit weight counter developing signals defining bit weight time periods for each character time period for identifying the various bits for each character in said cells.

3. A desk-top computer according to claim 2, wherein said timing means further comprises a second pair of counters disposed on said second chip and wherein said one pair of counters comprises self synchronizing circuit means for identifying a starting state of said first pair of counters upon the starting of the computer, and means for applying one character signal on said second single signal conductor to define a synchronizing time period and wherein said second pair of counters has means receptive of the character signal over said second single signal conductor for synchronizing the count therein to the character signal.

4. A desk-top computer according to claim 2, wherein said timing means has means defining two clock signals, wherein said registers have means receptive of the two clock signals for shifting said registers and wherein said bit weight counter has means receptive of said two clock signals for enabling same to count and wherein said character counter is responsive to one output line of said bit weight counter for enabling same to count.

5. A desk-top computer according to claim 4, wherein said timing means comprises a second pair of character and bit weight counters each including shift registers and wherein the bit weight counter of said second pair of counters has means receptive of said two clock signals for shifting same and the character counter of said second pair of counters has means receptive of another shift signal developed by the bit weight counter of said second pair of counters, a synchronizing circuit for identifying a first state of the shift register of said first pair of counters, a decoder circuit coactive with said first pair of counters to define a synchronizing time period applied to said second single signal conductor to connect the first pair of counters to the shift register of said second pair of counters for synchronizing said second pair of counters therewith.

6. A desk-top electronic computer according to claim 2, wherein said processing means comprises an increasing circuit connected to said address register for selecting in each timing cycle a new successive address and an address varying circuit for selectively varying the address stored in said address register for selecting a memory address different from that to be selected by said increasing circuit, said address varying circuit comprising means for varying a portion of said address for selecting a new address within a given partial address range of said read-only memory and means for completely replacing said address with a new address for selecting any address within the full address range of said read-only memory.

7. A computer according to claim 1, wherein said processing means comprises, a plurality of accumulating registers receptive of data signals to be processed, a circuit responsive to a given microinstruction for shifting the data of at least one accumulating register in one direction, a two-character auxiliary register connected to the one accumulating register and means responsive to a given microinstruction and the data in said two-character register to cause the shifting of the data in the opposite direction to said one direction.

8. A computer according to claim 1, wherein said timing means has means defining timing cycles and wherein said processing means comprises accumulating registers each receptive of data to be processed, counting means for counting each timing cycle from 0 to a predetermined number in response to a given microinstruction, and comparison means receptive of the output of said counting means and the output of said character counter to identify in each cycle the cell of the accumulating register being operated on.

9. A computer according to claim 8, comprising a decimal point register for storing the coded position of the decimal point, a first comparator receptive of the data from said counting means and the data of the decimal point register for comparing the two and a second comparator receptive of the complement of the data of said decimal point register and the data from said counting means for comparing the two.

10. A computer according to claim 1, wherein said circuit means comprises a first gate for enabling a memory address to pass through said first single signal conductor during a first period of time and a second gate for enabling a microinstruction to pass through said first single signal conductor during a second period of time.

* * * * *

UNITED STATES PATENT OFFICE
CERTIFICATE OF CORRECTION

PATENT NO. : 3,939,452
DATED : February 17, 1976
INVENTOR(S) : Gian Franco Faggian It is certified that error appears in the above-identified patent and that said Letters Patent are hereby corrected as shown below:

On the first page after
"[21] appln. No.: 378,354" insert

--[30] Foreign Application Priority Data

July 14, 1972        Italy . . . . . . .69277-A/72--.

Signed and Sealed this

Fourteenth Day of September 1976

[SEAL]

Attest:

RUTH C. MASON
*Attesting Officer*

C. MARSHALL DANN
*Commissioner of Patents and Trademarks*